United States Patent
Dickey et al.

(10) Patent No.: US 8,190,832 B2
(45) Date of Patent: May 29, 2012

(54) DATA STORAGE PERFORMANCE ENHANCEMENT THROUGH A WRITE ACTIVITY LEVEL METRIC RECORDED IN HIGH PERFORMANCE BLOCK STORAGE METADATA

(75) Inventors: Selwyn David Dickey, Byron, MN (US); Timothy John Klubertanz, Rochester, MN (US); Ginny Mahrer McCright, Rochester, MN (US); Jeffrey William Palm, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 642 days.

(21) Appl. No.: 12/361,809

(22) Filed: Jan. 29, 2009

(65) Prior Publication Data

US 2010/0191922 A1    Jul. 29, 2010

(51) Int. Cl.
*G06F 12/00* (2006.01)
(52) U.S. Cl. .................. 711/156; 711/165; 711/E12.002
(58) Field of Classification Search .......................... None
See application file for complete search history.

(56) References Cited

U.S. PATENT DOCUMENTS

| | | | |
|---|---|---|---|
| 5,200,864 A | | 4/1993 | Dunn et al. |
| 5,301,304 A | | 4/1994 | Menon |
| 5,490,248 A | | 2/1996 | Dan et al. |
| 5,848,026 A | * | 12/1998 | Ramamurthy et al. .... 365/238.5 |
| 5,951,691 A | | 9/1999 | Ng et al. |
| 6,260,124 B1 | * | 7/2001 | Crockett et al. ............... 711/162 |
| 6,297,891 B1 | | 10/2001 | Kara |
| 6,324,620 B1 | * | 11/2001 | Christenson et al. ......... 711/112 |
| 6,400,892 B1 | | 6/2002 | Smith |
| 6,438,646 B1 | | 8/2002 | Kitamura et al. |
| 6,748,486 B2 | | 6/2004 | Burton et al. |
| 6,775,693 B1 | | 8/2004 | Adams |
| 6,874,092 B1 | | 3/2005 | Motoyama et al. |
| 6,941,432 B2 | * | 9/2005 | Ronstrom ..................... 711/165 |
| 7,139,863 B1 | * | 11/2006 | Defouw et al. ............... 711/103 |
| 7,225,307 B2 | | 5/2007 | Micka et al. |

(Continued)

FOREIGN PATENT DOCUMENTS

EP    0612015 A1    8/1994

OTHER PUBLICATIONS

Boris Y. Chan et al. "A Framework for Cache Management for Mobile Databases: Design and Evaluation." 2001. Kluwer. Distributed and Parallel Databases. vol. 10. pp. 23-57.*

(Continued)

*Primary Examiner* — Reginald Bragdon
*Assistant Examiner* — Nathan N Sadler
(74) *Attorney, Agent, or Firm* — Matthew J. Bussan

(57) ABSTRACT

A sequence of fixed-size blocks defines a page (e.g., in a server system, storage subsystem, DASD, etc.). Each fixed-size block includes a data block and a footer. A high performance block storage metadata unit associated with the page is created from a confluence of the footers. The confluence of footers has space available for application metadata. In an embodiment, the metadata space is utilized to record a "write activity level" metric, and a timestamp. The metric indicates the write frequency or "hotness" of the page, and its value changes over time as the activity level changes. Frequently accessed pages may be mapped to higher performance physical disks and infrequently accessed pages may be mapped to lower power physical disks.

16 Claims, 12 Drawing Sheets

U.S. PATENT DOCUMENTS

| | | |
|---|---|---|
| 7,310,316 B2 | 12/2007 | Auerbach |
| 7,328,319 B1 | 2/2008 | Bottomley |
| 7,363,541 B2 | 4/2008 | Haagens et al. |
| 2002/0162014 A1 | 10/2002 | Przydatek et al. |
| 2003/0023933 A1 | 1/2003 | Duncan |
| 2005/0076226 A1 | 4/2005 | Boivie et al. |
| 2005/0216789 A1 | 9/2005 | Haagens et al. |
| 2006/0129901 A1 | 6/2006 | Arataki et al. |
| 2006/0206680 A1 | 9/2006 | Yamanaka et al. |
| 2007/0050542 A1 | 3/2007 | Benhase et al. |
| 2007/0083697 A1* | 4/2007 | Birrell et al. ............ 711/103 |
| 2007/0101096 A1* | 5/2007 | Gorobets ............ 711/203 |
| 2008/0005475 A1 | 1/2008 | Lubbers et al. |
| 2008/0024835 A1 | 1/2008 | Harano |
| 2008/0288712 A1* | 11/2008 | Cornwell et al. ............ 711/103 |
| 2008/0294935 A1* | 11/2008 | Ni et al. ............ 714/6 |
| 2009/0100212 A1* | 4/2009 | Boyd et al. ............ 711/5 |
| 2009/0259456 A1 | 10/2009 | Amann et al. |
| 2009/0259924 A1 | 10/2009 | Amann et al. |
| 2010/0146228 A1* | 6/2010 | Kanno et al. ............ 711/156 |
| 2010/0157671 A1* | 6/2010 | Mokhlesi ............ 365/185.03 |

OTHER PUBLICATIONS

Apple. "AppleSingle/AppleDouble Formats for Foreign Files Developer's Note." 1990. Apple.*

Jen-Wei Hsieh et al. "Efficient Identification of Hot Data for Flash Memory Storage Systems." Feb. 2006. ACM. ACM Transactions on Storage. vol. 2. pp. 22-40.*

Hung-Wei Tseng et al. "An Energy-Efficient Virtual Memory System with Flash Memory as the Secondary Storage." Oct. 2006. ACM. ISLPED '06.*

Gerald Houlder, "Data Integrity Proposal", Document T10/03-110r0, T10 technical committee of the InterNational Committee for Information Technology Standards (INCITS), Mar. 7, 2003. (http://www.t10.org/ftp/t10/document.03/03-110r0.pdf).

Gerald Houlder, "End to End Data Protection", Document T10/03-110r1, T10 technical committee of the InterNational Committee for Information Technology Standards (INCITS), May 7, 2003. (http://www.t10.org/ftp/t10/document.03/03-110r1.pdf).

George Penokie, "End-to-End Data Protection", Document T10/03-176r0, T10 technical committee of the InterNational Committee for Information Technology Standards (INCITS), May 1, 2003. (http://www.t10.org/ftp/t10/document.03/03-176r0.pdf).

Kieth Holt, "End-to-End Data Protection Justification", Document T10/03-224r0, T10 technical committee of the InterNational Committee for Information Technology Standards (INCITS), Jul. 11, 2003. (http://www.t10.org/ftp/t10/document.03/03-176r0.pdf).

David Broom et al., "Protecting Oracle Data Integrity: Hitachi Database Validator Technology and the Hitachi Freedom Storage Lightning 9900 V Series Systems", Technical White Paper, Hitachi Data Systems, Jan. 2003. (http://www.hds.com/assets/pdf/wp127_01_dbvalidator.pdf).

Narayan Ayalasomayajula et al., "DIF (Data Integrity Field): Provides End-to-End Protection of User Data", White Paper, Agilent Technologies, Aug. 31, 2004. (http://cp.literature.agilent.com/litweb/pdf/5989-0892EN.pdf).

J. Brown et al., "Oracle's Hardware Assisted Resilient Data (H.A.R.D.)", Nov. 16, 2001. (http://www.oracle.com/technology/deploy/availability/htdocs/hard_metalink_note_158367.pdf).

"Emulex, LSI, Oracle and Seagate Collaborate to Reduce System Downtime with Groundbreaking Data Integrity Initiative", Press Release, Emulex Corporation, Apr. 18, 2007. (http://www.emulex.com/press/2007/0418-01.jsp).

Gerald Houlder, Document T10/03-111r0, T10 technical committee of the InterNational Committee for Information Technology Standards INCITS), May 2, 2003, 18 pages. (http://www.t10.org/ftp/t10/document.03/03-111r0.pfd).

U.S. Appl. No. 11/871,532, to Boyd et al., entitled "Method, Apparatus, Computer Program Product, and Data Structure for Providing and Utilizing High Performance Block Storage Metadata", filed Oct. 12, 2007, assigned to International Business Machines Corporation.

U.S. Appl. No. 12/100,249, to Amann et al., entitled "Data Protection Method for Variable Length Records Utilizing High Performance Block Storage Metadata", filed Apr. 9, 2008, assigned to International Business Machines Corporation.

U.S. Appl. No. 12/100,237, to Amann et al., entitled "Data Protection for Variable Length Records by Utilizing High Performance Block Storage Metadata", filed Apr. 9, 2008, assigned to International Business Machines Corporation.

* cited by examiner

| Tag (1 Byte) - Bit | | | | | | | |
|---|---|---|---|---|---|---|---|
| 0 | 1 | 2 | 3 | 4 | 5 | 6 | 7 |
| 0 = Not start of page<br>1 = Start of page | | Distance (blocks) to last block in page (0-127) | | | | | |

DATA STORAGE PERFORMANCE ENHANCEMENT THROUGH A WRITE ACTIVITY LEVEL METRIC RECORDED IN HIGH PERFORMANCE BLOCK STORAGE METADATA

CROSS-REFERENCE TO RELATED APPLICATIONS

This patent application is related to pending U.S. Ser. No. 12/100,237, filed Apr. 9, 2008, entitled "DATA PROTECTION FOR VARIABLE LENGTH RECORDS BY UTILIZING HIGH PERFORMANCE BLOCK STORAGE METADATA", which is assigned to the assignee of the instant application.

This patent application is also related to pending U.S. Ser. No. 12/100,249, filed Apr. 9, 2008, entitled "DATA PROTECTION METHOD FOR VARIABLE LENGTH RECORDS BY UTILIZING HIGH PERFORMANCE BLOCK STORAGE METADATA", which is assigned to the assignee of the instant application.

This patent application is also related to pending U.S. Ser. No. 11/871,532, filed Oct. 12, 2007, entitled "METHOD, APPARATUS, COMPUTER PROGRAM PRODUCT, AND DATA STRUCTURE FOR PROVIDING AND UTILIZING HIGH PERFORMANCE BLOCK STORAGE METADATA", which is assigned to the assignee of the instant application.

BACKGROUND OF THE INVENTION

1. Field of Invention

The present invention relates in general to the digital data processing field and, in particular, to block data storage (i.e., data storage organized and accessed via blocks of fixed size). More particularly, the present invention relates to a mechanism for enhancing data storage performance (e.g., data access speed, power consumption, and/or cost) through the utilization of a write activity level metric recorded in high performance block storage metadata.

2. Background Art

In the latter half of the twentieth century, there began a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

A modern computer system typically comprises at least one central processing unit (CPU) and supporting hardware, such as communications buses and memory, necessary to store, retrieve and transfer information. It also includes hardware necessary to communicate with the outside world, such as input/output controllers or storage controllers, and devices attached thereto such as keyboards, monitors, tape drives, disk drives, communication lines coupled to a network, etc. The CPU or CPUs are the heart of the system. They execute the instructions which comprise a computer program and direct the operation of the other system components.

The overall speed of a computer system is typically improved by increasing parallelism, and specifically, by employing multiple CPUs (also referred to as processors). The modest cost of individual processors packaged on integrated circuit chips has made multiprocessor systems practical, although such multiple processors add more layers of complexity to a system.

From the standpoint of the computer's hardware, most systems operate in fundamentally the same manner. Processors are capable of performing very simple operations, such as arithmetic, logical comparisons, and movement of data from one location to another. But each operation is performed very quickly. Sophisticated software at multiple levels directs a computer to perform massive numbers of these simple operations, enabling the computer to perform complex tasks. What is perceived by the user as a new or improved capability of a computer system is made possible by performing essentially the same set of very simple operations, using software having enhanced function, along with faster hardware.

Computer systems are designed to read and store large amounts of data. A computer system will typically employ several types of storage devices, each used to store particular kinds of data for particular computational purposes. Electronic devices in general may use programmable read-only memory (PROM), random access memory (RAM), flash memory, magnetic tape or optical disks as storage medium components, but many electronic devices, especially computer systems, store data in a direct access storage device (DASD) such as a hard disk drive (HDD).

Although such data storage is not limited to a particular direct access storage device, one will be described by way of example. Computer systems typically store data on disks of a hard disk drive (HDD). A hard disk drive is commonly referred to as a hard drive, disk drive, or direct access storage device (DASD). A hard disk drive is a non-volatile storage device that stores digitally encoded data on one or more rapidly rotating disks (also referred to as platters) with magnetic surfaces. A hard disk drive typically includes one or more circular magnetic disks as the storage media which are mounted on a spindle. The disks are spaced apart so that the separated disks do not touch each other. The spindle is attached to a motor which rotates the spindle and the disks, normally at a relatively high revolution rate, e.g., 4200, 5400 or 7200 rpm. A disk controller activates the motor and controls the read and write processes.

One or more hard disk drives may be enclosed in the computer system itself, or may be enclosed in a storage subsystem that is operatively connected with the computer system. A modern mainframe computer typically utilizes one or more storage subsystems with large disk arrays that provide efficient and reliable access to large volumes of data. Examples of such storage subsystems include network attached storage (NAS) systems and storage area network (SAN) systems. Disk arrays are typically provided with cache memory and advanced functionality such as RAID (redundant array of independent disks) schemes and virtualization.

Various schemes have been proposed to optimize data storage performance (e.g., data access speed, power consumption, and/or cost) of hard disk drives based on data-related factors such as the type of data being stored or retrieved, and whether or not the data is accessed on a relatively frequent basis.

U.S. Pat. No. 6,400,892, issued Jun. 4, 2002 to Gordon J. Smith, entitled "Adaptive Disk Drive Operation", discloses a scheme for adaptively controlling the operating speed of a disk drive when storing or retrieving data and choosing a disk location for storing the data. The choice of speed and disk location are based on the type of data being stored or retrieved. In storing data on a storage device (e.g., a disk drive), it is determined what type of data is to be stored, distinguishing between normal data and slow data, such as audio data or text messages. Slow data is data which can be used effectively when retrieved at a relatively low storage medium speed. Slow data is further assigned to be stored at a predetermined location on the storage medium selected to avoid reliability problems due to the slower medium speed. Storing and retrieving such data at a slower medium speed from the assigned location increases drive efficiency by conserving power without compromising storage device reliability. An electrical device, such as a host computer and/or a disk drive controller, receives/collects data and determines the type of data which has been received/collected. While this scheme purports to increase drive efficiency through the determination of the type of data which is to be received/collected, it does not utilize a write activity level metric.

U.S. Pat. No. 5,490,248, issued Feb. 6, 1996 to Asit Dan et al., entitled "Disk Array System Having Special Parity Groups for Data Blocks With High Update Activity", discloses a digital storage disk array system in which parity blocks are created and stored in order to be able to recover lost data blocks in the event of a failure of a disk. High-activity groups are created for data blocks having high write activity and low-activity parity groups are created for data blocks not having high write activity. High activity parity blocks formed from the high-activity data blocks are then stored in a buffer memory of a controller rather than on the disks in order to reduce the number of disk accesses during updating. An LRU stack is used to keep track of the most recently updated data blocks, including both high-activity data blocks that are kept in buffer memory and warm-activity data blocks that have the potential of becoming hot in the future. A hash table is used to keep the various information associated with each data block that is required either for the identification of hot data blocks or for the maintenance of special parity groups. This scheme has several disadvantages. First, the information in the LRU stack and hash table may be lost when power is removed unless this information is stored in nonvolatile memory. Secondly, while the number of special parity groups is small and can be managed by a table-lookup, no write activity information is available with respect to the vast majority of the data blocks. Finally, although the disk array subsystem manages the special parity groups through table-lookups, the information in the LRU stack and the hash table is not available to the host computer.

U.S. Patent Application Publication No. 2008/0005475, published Jan. 3, 2008 to Clark E. Lubbers et al., entitled "Hot Data Zones", discloses a method and apparatus directed to the adaptive arrangement of frequently accessed data sets in hot data zones in a storage array. A virtual hot space is formed to store frequently accessed data. The virtual hot space comprises at least one hot data zone which extends across storage media of a plurality of arrayed storage devices over a selected seek range less than an overall radial width of the media. The frequently accessed data are stored to the hot data zone(s) in response to a host level request, such as from a host level operating system (OS) or by a user which identifies the data as frequently accessed data. Alternatively, or additionally, access statistics are accumulated and frequently accessed data are migrated to the hot data zone(s) in relation thereto. Lower accessed data sets are further preferably migrated from the hot data zone(s) to another location of the media. For example, the system can be configured to provide indications to the host that data identified at the host level as hot data are being infrequently accessed, along with a request for permission from the host to migrate said data out of the hot data zone. Cached data are managed by a cache manager using a data structure referred to as a stripe data descriptor (SDD). Each SDD holds data concerning recent and current accesses to the data with which it is associated. SDD variables include access history, last offset, last block, timestamp (time of day, TOD), RAID level employed, stream parameters and speculative data status. A storage manager operates in conjunction with the cache manager to assess access history trends. This scheme has several disadvantages. First, the access statistics would be lost when power is removed from the storage manager unless the access statistics are stored in nonvolatile memory. Secondly, access history statistics accumulated on an on-going basis for all of the data would occupy an inordinate amount of memory space. On the other hand, if the access statistics are accumulated for only a selected period of time, access statistics would not be available with respect to any data not accessed during the selected period of time.

Therefore, a need exists for an enhanced mechanism for improving data storage performance (e.g., data access speed, power consumption, and/or cost) through the utilization of a write activity level metric recorded in high performance block storage metadata.

A brief discussion of data structures for a conventional sequence or "page" of fixed-size blocks is now presented to provide background information helpful in understanding the present invention. FIG. 1 is a schematic diagram illustrating an example data structure for a conventional sequence 100 of fixed-size blocks 102 (e.g., 512 bytes) that together define a page. Typically, for performance reasons no metadata is associated with any particular one of the blocks 102 or the page 100 unless such metadata is written within the blocks 102 by an application. Metadata is information describing, or instructions regarding, the associated data blocks. Although there has been recognition in the digital data processing field of the need for high performance block storage metadata to enable new applications, such as data integrity protection, attempts to address this need have achieved mixed success. One notable attempt to address this need for high performance block storage metadata is the T10 End-to-End Data Protection architecture.

The T10 End-to-End (ETE) Data Protection architecture is described in various documents of the T10 technical committee of the InterNational Committee for Information Technology Standards (INCITS), such as T10/03-110r0, T10/03-111r0 and T10/03-176r0. As discussed in more detail below, two important drawbacks of the current T10 ETE Data Protection architecture are: 1) no protection is provided against "stale data"; and 2) very limited space is provided for metadata.

FIG. 2 is a schematic diagram illustrating an example data structure for a conventional sequence 200 (referred to as a "page") of fixed-size blocks 202 in accordance with the current T10 ETE Data Protection architecture. Each fixed-size block 202 includes a data block 210 (e.g., 512 bytes) and a T10 footer 212 (8 bytes). Each T10 footer 212 consists of three fields, i.e., a Ref Tag field 220 (4 bytes), a Meta Tag field 222 (2 bytes), and a Guard field 224 (2 bytes). The Ref Tag field 220 is a four byte value that holds information identifying within some context the particular data block 210 with which that particular Ref Tag field 220 is associated. Typically, the first transmitted Ref Tag field 220 contains the least significant four bytes of the logical block address (LBA) field of the command associated with the data being transmitted. During a multi-block operation, each subsequent Ref Tag field 220 is incremented by one. The Meta Tag field 222 is a two byte value that is typically held fixed within the context of a single command. The Meta Tag field 222 is generally only meaningful to an application. For example, the Meta Tag field 222 may be a value indicating a logical unit number in a Redundant Array of Inexpensive/Independent Disks (RAID)

system. The Guard field 224 is a two byte value computed using the data block 210 with which that particular Guard field 224 is associated. Typically, the Guard field 224 contains the cyclic redundancy check (CRC) of the contents of the data block 210 or, alternatively, may be checksum-based.

It is important to note that under the current T10 ETE Data Protection architecture, metadata is associated with a particular data block 202 but not the page 200. The T10 metadata that is provided under this approach has limited usefulness. The important drawbacks of the current T10 ETE Data Protection architecture mentioned above [i.e., 1) no protection against "stale data"; and 2) very limited space for metadata] find their origin in the limited usefulness of the metadata that is provided under this scheme. First, the current T10 approach allows only 2 bytes (i.e., counting only the Meta Tag field 222) or, at best, a maximum of 6 bytes (i.e., counting both the Ref Tag field 220 and the Meta Tag field 222) for general purpose metadata space, which is not sufficient for general purposes. Second, the current T10 approach does not protect against a form of data corruption known as "stale data", which is the previous data in a block after data written over that block was lost, e.g., in transit, from write cache, etc. Since the T10 metadata is within the footer 210, stale data appears valid and is therefore undetectable as corrupted.

SUMMARY OF THE INVENTION

According to the preferred embodiments of the present invention, a sequence of fixed-size blocks defines a page (e.g., in a server system, storage subsystem, DASD, etc.). Each fixed-size block includes a data block and a footer. A high performance block storage metadata unit associated with the page is created from a confluence of the footers. The confluence of footers has space available for application metadata. The metadata space is utilized to record a "write activity level" metric, and a timestamp. The write activity level metric indicates the write frequency or "hotness" of the page, and its value changes over time as the activity level changes. The write activity level metric is used for enhancing storage subsystem performance and minimizing power requirements by mapping frequently accessed pages to higher performance physical disks and mapping infrequently accessed pages to lower power physical disks. This approach is advantageous in that the write activity level metric is recorded on a non-volatile basis and may be readily communicated between system components (e.g., between a host computer and a storage subsystem).

The foregoing and other features and advantages of the invention will be apparent from the following more particular description of the preferred embodiments of the invention, as illustrated in the accompanying drawings.

BRIEF DESCRIPTION OF THE DRAWINGS

The preferred exemplary embodiments of the present invention will hereinafter be described in conjunction with the appended drawings, where like designations denote like elements.

FIG. 6 is a schematic diagram illustrating an example data structure for a Tag field in accordance with the preferred embodiments of the present invention.

DETAILED DESCRIPTION OF THE PREFERRED EMBODIMENTS

1.0 Overview

In accordance with the preferred embodiments of the present invention, a sequence of fixed-size blocks defines a page (e.g., in a server system, storage subsystem, DASD, etc.). Each fixed-size block includes a data block and a footer. A high performance block storage metadata unit associated with the page is created from a confluence of the footers. The confluence of footers has space available for application metadata. The metadata space is utilized to record a "write activity level" metric, and a timestamp. The write activity level metric indicates the write frequency or "hotness" of the page, and its value changes over time as the activity level changes. The write activity level metric is used for enhancing storage subsystem performance and minimizing power requirements by mapping frequently accessed pages to higher performance physical disks and mapping infrequently accessed pages to lower power physical disks. This approach is advantageous in that the write activity level metric is recorded on a non-volatile basis and may be readily communicated between system components (e.g., between a host computer and a storage subsystem).

2.0 Detailed Description

Figure 3:
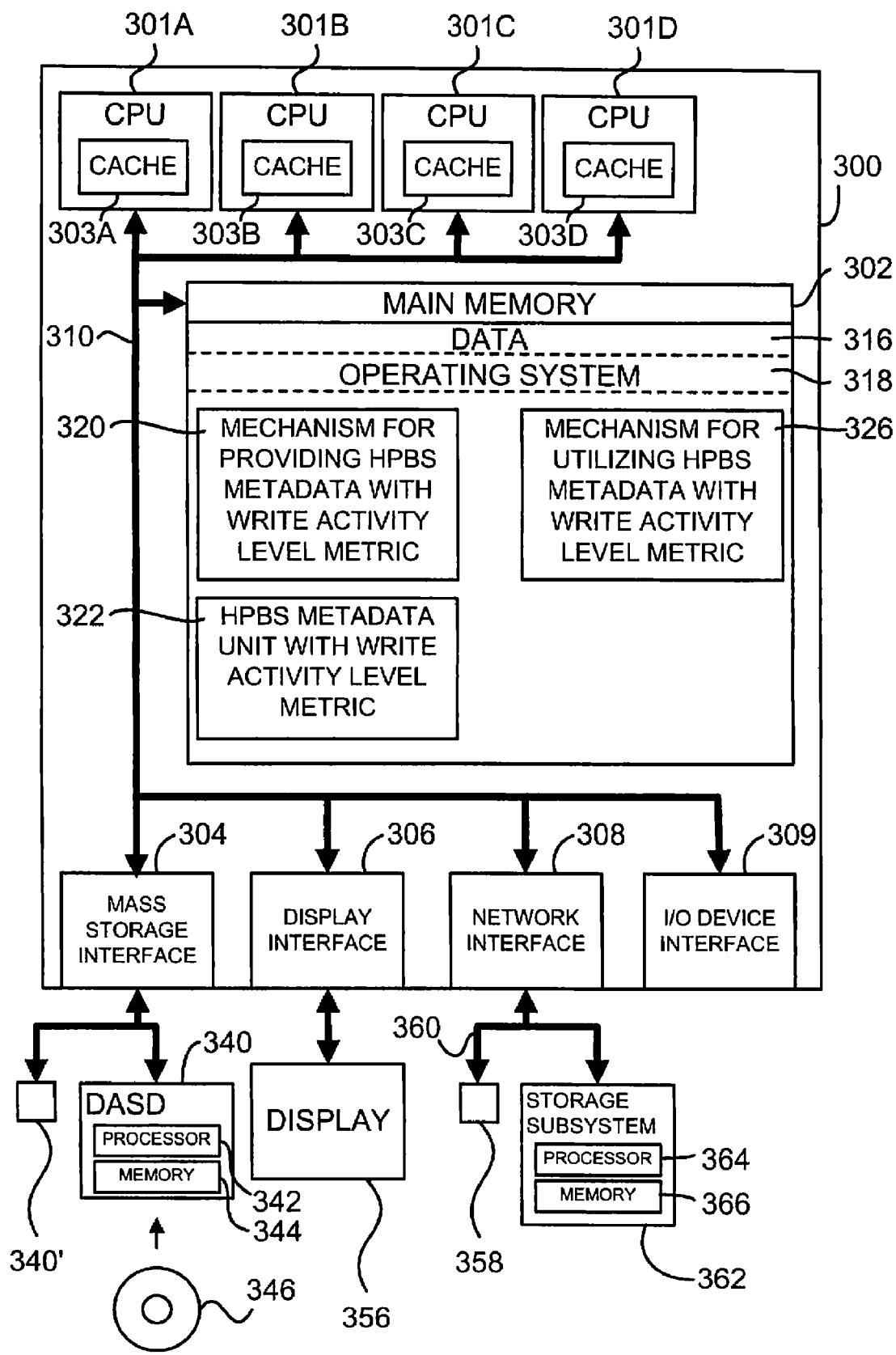
FIG. 3 is a schematic diagram of a computer apparatus for providing high performance block storage (HPBS) metadata containing a write activity level (WAL) metric in accordance with the preferred embodiments of the present invention.

A computer system implementation of the preferred embodiments of the present invention will now be described with reference to FIG. 3 in the context of a particular computer system 300, i.e., an IBM Power Systems computer system. However, those skilled in the art will appreciate that the method, apparatus, computer program product, and data structure of the present invention apply equally to any computer system, regardless of whether the computer system is a complicated multi-user computing apparatus, a single user workstation, a PC, a DASD (such as a hard disk drive), a storage subsystem or an embedded control system. As shown in FIG. 3, computer system 300 comprises one or more processors 301A, 301B, 301C and 301D, a main memory 302, a mass storage interface 304, a display interface 306, a network interface 308, and an I/O device interface 309. These system components are interconnected through the use of a system bus 310.

FIG. 3 is intended to depict the representative major components of computer system 300 at a high level, it being understood that individual components may have greater complexity than represented in FIG. 3, and that the number, type and configuration of such components may vary. For example, computer system 300 may contain a different number of processors than shown.

Processors 301A, 301B, 301C and 301D (also collectively referred to herein as "processors 301") process instructions and data from main memory 302. Processors 301 temporarily hold instructions and data in a cache structure for more rapid access. In the embodiment shown in FIG. 3, the cache structure comprises caches 303A, 303B, 303C and 303D (also collectively referred to herein as "caches 303") each associated with a respective one of processors 301A, 301B, 301C and 301D. For example, each of the caches 303 may include a separate internal level one instruction cache (L1 I-cache) and level one data cache (L1 D-cache), and level two cache (L2 cache) closely coupled to a respective one of processors 301. However, it should be understood that the cache structure may be different; that the number of levels and division of function in the cache may vary; and that the system might in fact have no cache at all.

Main memory 302 in accordance with the preferred embodiments contains data 316, an operating system 318 and application software, utilities and other types of software. In addition, in accordance with the preferred embodiments of the present invention, the main memory 302 also includes a mechanism for providing high performance block storage (HPBS) metadata containing a write activity level (WAL) metric 320, a high performance block storage (HPBS) metadata unit containing a write activity level (WAL) metric 322, and a mechanism for utilizing high performance block storage (HPBS) metadata containing a write activity level (WAL) metric 326, each of which may in various embodiments exist in any number. Although the providing mechanism 320, the HPBS metadata unit 322, and the utilizing mechanism 326 are illustrated as being contained within the main memory 302, in other embodiments some or all of them may be on different electronic devices (e.g., on a direct access storage device 340 and/or on a storage subsystem 362) and may be accessed remotely.

In accordance with the preferred embodiments of the present invention, the providing mechanism 320 provides one or more HPBS metadata units 322 containing a write activity level (WAL) metric as further described below with reference to FIGS. 4-8 (schematic diagrams illustrating exemplary data structures), FIG. 9 (a flow diagram illustrating an exemplary method for providing HPBS metadata containing a WAL metric), and FIG. 10 (a graphical diagram illustrating an exemplary technique for determining a WAL metric). As described in more detail below, the HPBS metadata unit 322 is associated with a page that is defined by a sequence of fixed-size blocks. Each of the fixed-size blocks includes a data block and a footer. The HPBS metadata unit 322 is created from a confluence of these footers. In accordance with the preferred embodiments of the present invention, the HPBS metadata unit 322 contains a "write-activity-index" (e.g., a value ranging from 0 "cold" to 127 "hot") and a timestamp (e.g., a 32-bit number representing the number of seconds between Jan. 1, 2000 and the previous write).

Generally, the page with which the HPBS metadata unit 322 is associated may have any suitable size. Preferably, as described in more detail below, the page size is between 1 and 128 blocks and, more preferably, the page size is 8 blocks. In an alternative embodiment, the page may be an emulated record that emulates a variable length record, such as a Count-Key-Data (CKD) record or an Extended-Count-Key-Data (ECKD) record. For example, the present invention is applicable in the context of the enhanced mechanism for providing data protection for variable length records by utilizing high performance block storage (HPBS) metadata disclosed in U.S. Ser. No. 12/100,237, filed Apr. 9, 2008, entitled "DATA PROTECTION FOR VARIABLE LENGTH RECORDS BY UTILIZING HIGH PERFORMANCE BLOCK STORAGE METADATA", and U.S. Ser. No. 12/100,249, filed Apr. 9, 2008, entitled "DATA PROTECTION METHOD FOR VARIABLE LENGTH RECORDS BY UTILIZING HIGH PERFORMANCE BLOCK STORAGE METADATA", each of which is assigned to the assignee of the instant application and each of which is hereby incorporated herein by reference in its entirety.

In accordance with the preferred embodiments of the present invention, the utilizing mechanism 326 utilizes one or more high performance block storage (HPBS) metadata units 322 in applications as further described below with reference to FIGS. 11 and 12 (flow diagrams illustrating exemplary methods for utilizing HPBS metadata containing a WAL metric).

In the preferred embodiments of the present invention, the providing mechanism 320 and the utilizing mechanism 326 include instructions capable of executing on the processors 301 or statements capable of being interpreted by instructions executing on the processors 301 to perform the functions as further described below with reference to FIGS. 9-12. In another embodiment, either the providing mechanism 320 or the utilizing mechanism 326, or both, may be implemented in hardware via logic gates and/or other appropriate hardware techniques in lieu of, or in addition to, a processor-based system.

While the providing mechanism 320 and the utilizing mechanism 326 are shown separate and discrete from each other in FIG. 3, the preferred embodiments expressly extend to these mechanisms being implemented within a single component. In addition, either the providing mechanism 320 or the utilizing mechanism 326, or both, may be implemented in the operating system 318 or application software, utilities, or other types of software within the scope of the preferred embodiments.

Computer system 300 utilizes well known virtual addressing mechanisms that allow the programs of computer system 300 to behave as if they have access to a large, single storage entity instead of access to multiple, smaller storage entities such as main memory 302 and DASD devices 340, 340'. Therefore, while data 316, operating system 318, the providing mechanism 320, the HPBS metadata unit 322, and the utilizing mechanism 326, are shown to reside in main memory 302, those skilled in the art will recognize that these items are not necessarily all completely contained in main memory 302 at the same time. It should also be noted that the term "memory" is used herein to generically refer to the entire virtual memory of the computer system 300.

Data 316 represents any data that serves as input to or output from any program in computer system 300. Operating system 318 is a multitasking operating system known in the industry as UNIX, Linux operating systems (OS); however, those skilled in the art will appreciate that the spirit and scope of the present invention is not limited to any one operating system.

Processors 301 may be constructed from one or more microprocessors and/or integrated circuits. Processors 301 execute program instructions stored in main memory 302. Main memory 302 stores programs and data that may be accessed by processors 301. When computer system 300 starts up, processors 301 initially execute the program instructions that make up operating system 318. Operating system 318 is a sophisticated program that manages the resources of computer system 300. Some of these resources are processors 301, main memory 302, mass storage interface 304, display interface 306, network interface 308, I/O device interface 309 and system bus 310.

Although computer system 300 is shown to contain four processors and a single system bus, those skilled in the art will appreciate that the present invention may be practiced using a computer system that has a different number of processors and/or multiple buses. In addition, the interfaces that are used in the preferred embodiments each include separate, fully programmed microprocessors that are used to off-load compute-intensive processing from processors 301. However, those skilled in the art will appreciate that the present invention applies equally to computer systems that simply use I/O adapters to perform similar functions.

Mass storage interface 304 is used to connect mass storage devices (such as direct access storage devices 340, 340') to computer system 300. The direct access storage devices (DASDs) 340, 340' may each include a processor 342 and a memory 344 (in FIG. 3, the processor 342 and the memory 344 are only shown with respect to one of the direct access storage devices, i.e., the DASD 340). One specific type of direct access storage device is a hard disk drive (HDD). Another specific type of direct access storage device is a readable and writable CD ROM drive, which may store data to and read data from a CD ROM 346. In accordance with the preferred embodiments of the present invention, the data stored to and read from the DASDs 340, 340' (e.g., on the CD ROM 346, a hard disk, or other storage media) includes HPBS metadata containing a WAL metric. In the DASDs 340, 340', the footer of a fixed-size block will generally be written on the storage media together with the data block of the fixed-size block. This differs from the memory 302 of the computer system 300, where the footer of a fixed-size block is written in a separate physical area (i.e., the HPBS metadata unit 322) than where the data block of the fixed-size block is written.

In accordance the preferred embodiments of the present invention, the DASDs 340, 340' may have different performance, power consumption and/or cost characteristics, and the utilizing mechanism 326 may use these characteristics along with the WAL metric recorded in the HPBS metadata to enhance data storage performance. For example, the DASD 340 may have a higher performance (e.g., higher data access speed, lower error rate, etc.), higher power consumption and/or a higher purchase price relative to the DASD 340'. In accordance with the preferred embodiments of the present invention, the WAL metric recorded in the HPBS metadata may be used by the utilizing mechanism 326 in mapping more frequently accessed logical unit numbers (LUNs) and pages to higher performance (and higher power/cost) physical disks (e.g., the DASD 340), and mapping infrequently accessed LUNs and pages to lower power (and lower performance/cost) physical disks (e.g., the DASD 340'). The higher performance physical disks may have, for example, a higher disk revolution rate (e.g., 7200 rpm) and/or reduced seek latencies as compared to those performance characteristics of the lower power physical disks. The physical disks referred to herein, especially the high performance physical disks, may also be emulated disks or flash disks (solid state disks).

Mapping the more frequently accessed logical unit numbers (LUNs) and pages to high performance physical disks permits the more frequently accessed data, which typically comprise a small proportion of the overall data, to be quickly accessed (without disadvantageously mapping the infrequently accessed data, which typically make up most of the overall data, to these same power hungry physical disks). Moreover, mapping the infrequently accessed LUNs and pages to low power (and lower performance) physical disks minimizes power requirements for storing this infrequently accessed data, which typically make up most of the overall data (without disadvantageously mapping the more frequently accessed data to these same performance robbing physical disks).

Moreover, the write activity level (WAL) metric in accordance with the preferred embodiments of the present invention is advantageous because the WAL metric is recorded on a non-volatile basis and may be readily communicated between system components (e.g., between a host computer and one or more DASDs and/or a storage subsystem). Hence, the WAL metric is not lost when power is removed and is available throughout the system, including the host computer. In accordance with the preferred embodiments of the present invention (as described in more detail below with reference to FIG. 9), a DASD or a storage subsystem reads a page and transmits the page (including the WAL metric value) to the host computer during a write operation, and then the host computer modifies one or more data blocks of the page, computes an updated WAL metric value, and transmits the revised page (including the updated WAL metric value) to one or more DASDs and/or a storage subsystem so that the revised page can be written thereto. In this regard (as described in more detail below with reference to FIG. 11), the host computer may utilize the updated WAL metric value to determine whether to transmit the revised page to a higher performance DASD or to a lower power DASD. Also (as described in more detail below with reference to FIG. 12), the host computer may utilize the updated WAL metric value to determine whether to transmit the revised with more or less granularity page to an asynchronous mirror. In addition, the host computer may utilize the updated WAL metric value for other purposes, such as in deciding whether or not to keep the revised page in its own cache (e.g., one or more of the caches 303). Likewise, the host computer may analyze trends in the WAL metrics associated with pages recently accessed to dynamically tune/optimize values (e.g., $I_{max}$, $-I_{max}$, $T_1$, and $T_2$) of a write-activity-index increment function (described in detail below with reference to FIG. 10).

In accordance with the preferred embodiments of the present invention, in lieu of, or in addition to, storing the providing mechanism 320 and the utilizing mechanism 326 on the main memory 302 of the computer system 300, the memory 344 of the DASDs 340, 340' may be used to store the providing mechanism 320 and/or the utilizing mechanism 326. Hence, in the preferred embodiments of the present invention, the providing mechanism 320 and the utilizing mechanism 326 include instructions capable of executing on the processor 342 of the DASDs 340, 340' or statements capable of being interpreted by instructions executing on the processor 342 of the DASDs 340, 340' to perform the functions as further described below with reference to FIGS. 9-12. For example, the DASDs 340, 340' may be "intelligent" storage devices that "autonomously" (i.e., without the need for a command from the computer system 300) map more frequently accessed LUNs and pages to higher performance physical disks and map infrequently accessed LUNs and pages to lower power physical disks.

More generally, an architecture in accordance with the preferred embodiments of the present invention allows a storage controller (e.g., the storage controller of the DASDs 340, 340') to act autonomously (from the computer or system that wrote the page) on the data according to instructions encoded in the metadata space (e.g., the space available for application metadata 550 (shown in FIG. 5), described below).

Display interface 306 is used to directly connect one or more displays 356 to computer system 300. These displays 356, which may be non-intelligent (i.e., dumb) terminals or fully programmable workstations, are used to allow system administrators and users (also referred to herein as "operators") to communicate with computer system 300. Note, however, that while display interface 306 is provided to support communication with one or more displays 356, computer system 300 does not necessarily require a display 356, because all needed interaction with users and processes may occur via network interface 308.

Network interface 308 is used to connect other computer systems and/or workstations 358 and/or storage subsystems 362 to computer system 300 across a network 360. The present invention applies equally no matter how computer system 300 may be connected to other computer systems and/or workstations and/or storage subsystems, regardless of whether the network connection 360 is made using present-day analog and/or digital techniques or via some networking mechanism of the future. In addition, many different network protocols can be used to implement a network. These protocols are specialized computer programs that allow computers to communicate across network 360. TCP/IP (Transmission Control Protocol/Internet Protocol) is an example of a suitable network protocol.

The storage subsystem 362 may include a processor 364 and a memory 366, similar to the processor 342 and the memory 344 in the DASDs 340, 340'. In accordance with the preferred embodiments of the present invention, the data stored to and read from the storage subsystem 362 (e.g., from hard disk drives, tape drives, or other storage media) includes high performance block storage (HPBS) metadata containing a write activity level (WAL) metric. In the storage subsystem 362, as in the DASDs 340, 340', the footer of a fixed-size block will generally be written on the storage media together with the data block of the fixed size block. This differs from the memory 302 of the computer system 300, where the footer of a fixed-size block is written in a separate physical area (i.e., the high performance block storage (HPBS) metadata unit 322) than where the data block of the fixed-size block is written.

In accordance the preferred embodiments of the present invention, the utilizing mechanism 326 may utilize the WAL metric recorded in the HPBS metadata to optimize the data storage performance of the storage subsystem 362. For example, in an embodiment in which the storage subsystem 362 is a remote asynchronous mirror, hot sections of a logical unit number (LUN) may be transmitted to the remote asynchronous mirror with more granularity than colder sections, which optimizes memory, makes optimal use of the available communications line bandwidth, and decreases the lag time between the two copies (i.e., the synchronous copy and the remote asynchronous copy).

In accordance with the preferred embodiments of the present invention, in lieu of, or in addition to, storing the providing mechanism 320 and the utilizing mechanism 326 on the main memory 302 of the computer system 300, the memory 366 of the storage subsystem 362 may be used to store the providing mechanism 320 and/or the utilizing mechanism 326. Hence, in the preferred embodiments of the present invention, the mechanisms 320 and 326 include instructions capable of executing on the processor 364 of the storage subsystem 362 or statements capable of being interpreted by instructions executing on the processor 364 of the storage subsystem 362 to perform the functions as further described below with reference to FIGS. 9-12. For example, the storage subsystem 362 may be an "intelligent" external storage subsystem that "autonomously" (i.e., without the need for a command from the computer system 300) maps more frequently accessed LUNs and pages to higher performance physical disks and maps infrequently accessed LUNs and pages to lower power physical disks.

More generally, an architecture in accordance with the preferred embodiments of the present invention allows a storage controller (e.g., the storage controller of the storage subsystem 362) to act autonomously (from the computer or system that wrote the page) on the data according to instructions encoded in the metadata space (e.g., the space available for application metadata 550 (shown in FIG. 5), described below).

The I/O device interface 309 provides an interface to any of various input/output devices.

At this point, it is important to note that while this embodiment of the present invention has been and will be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks and CD ROMs (e.g., CD ROM 346 of FIG. 3), and transmission type media such as digital and analog communications links (e.g., network 360 in FIG. 3).

Figure 4:
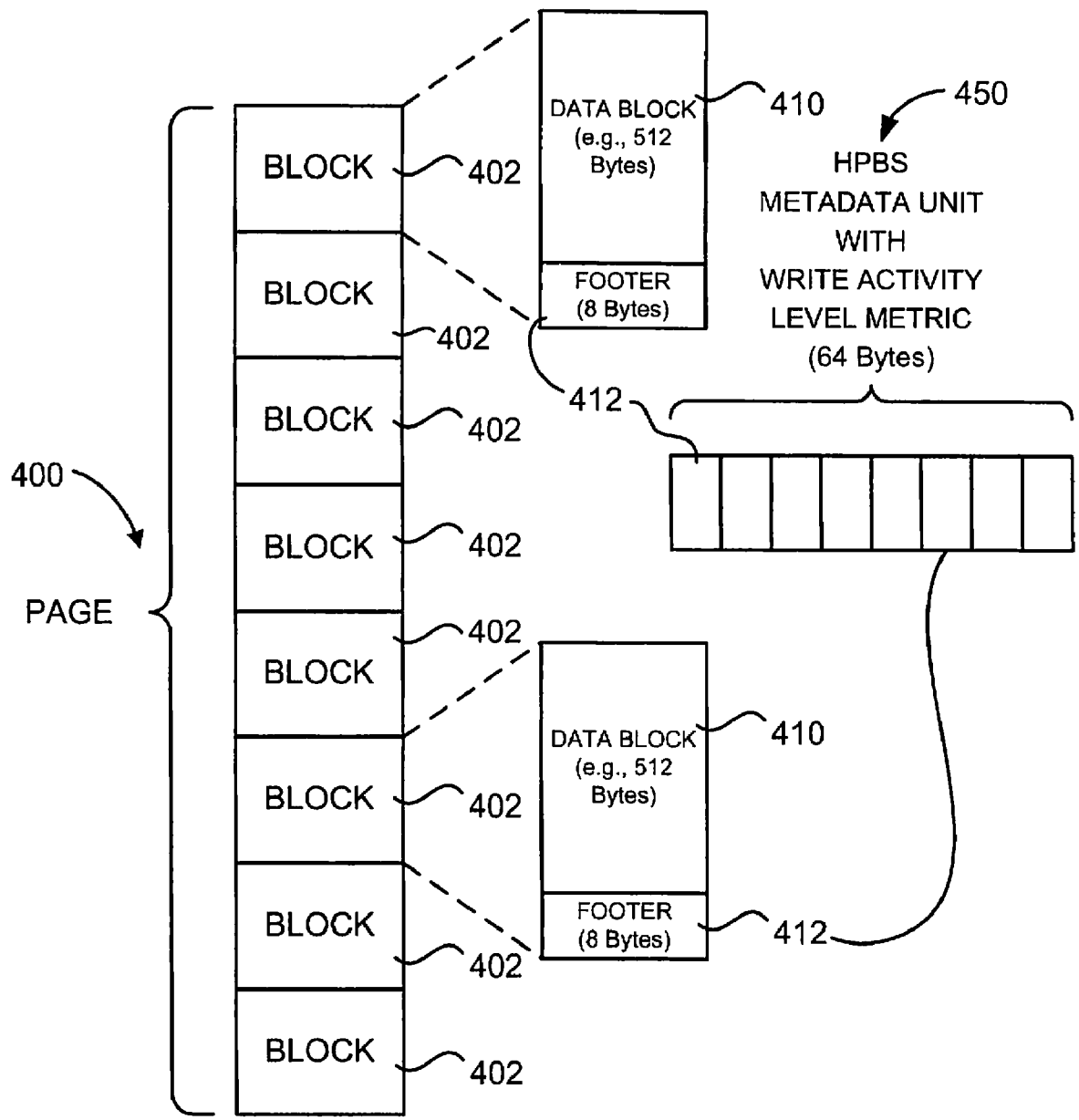
FIG. 4 is a schematic diagram illustrating an example data structure for a sequence (i.e., page) of fixed-size blocks for providing high performance block storage (HPBS) metadata containing a write activity level (WAL) metric in accordance with the preferred embodiments of the present invention.

FIG. 4 is a schematic diagram illustrating an example data structure for a sequence 400 (also referred to herein as a "page") of fixed-size blocks 402 for providing high performance block storage (HPBS) metadata containing a write activity level (WAL) metric in accordance with the preferred embodiments of the present invention. Generally, the entire page 400 is read/written together in one operation. Although the page size of the page 400 shown in FIG. 4 is 8 blocks (i.e., 8 fixed-size blocks 402), one skilled in the art will appreciate that a page in accordance with the preferred embodiments of the present invention may have any suitable page size. Preferably, the page size is between 1 to 128 blocks and, more preferably, the page size is 8 blocks. Alternatively, the page may be an emulated record that emulates a variable length record, such as a Count-Key-Data (CKD) record or an Extended-Count-Key-Data (ECKD) record. Each fixed-size block 402 includes a data block 410 (e.g., 512 bytes) and a footer 412 (e.g., 8 bytes). Only the data block 410 and the footer 412 of the first and the sixth fixed-size blocks 402 are shown in FIG. 4. Preferably, each of the data blocks 410 is 512 bytes and each of the footers 412 is 8 bytes. However, one skilled in the art will appreciate that the data blocks and the footers in accordance with the preferred embodiments of the present invention may have any suitable size.

As shown in FIG. 4, in accordance with the preferred embodiments of the present invention, a high performance block storage (HPBS) metadata unit containing a write activity level (WAL) metric 450 is created from a confluence of the footers 412. The HPBS metadata unit 450 in FIG. 4 corresponds with the HPBS metadata unit 322 in FIG. 3. While the exemplary HPBS metadata unit 450 shown in FIG. 4 is 64 bytes (i.e., 8 footers×8-bytes/footer), one skilled in the art will appreciate that the HPBS metadata unit in accordance with the preferred embodiments is not limited to 64 bytes (i.e., the size of the HPBS metadata unit is the product of the number of fixed-size blocks/page and the size of the footer within each of the fixed-size blocks). The sequential order of the footers in the page is retained in the confluence of footers that make up the HPBS metadata unit containing a WAL metric 450. For example, as shown in FIG. 4, the footers 412 of the first and sixth fixed-size blocks 402 in the page 400 respectively occupy the first and sixth "slots" in the confluence of footers that define the HPBS metadata unit 450.

Figure 5:
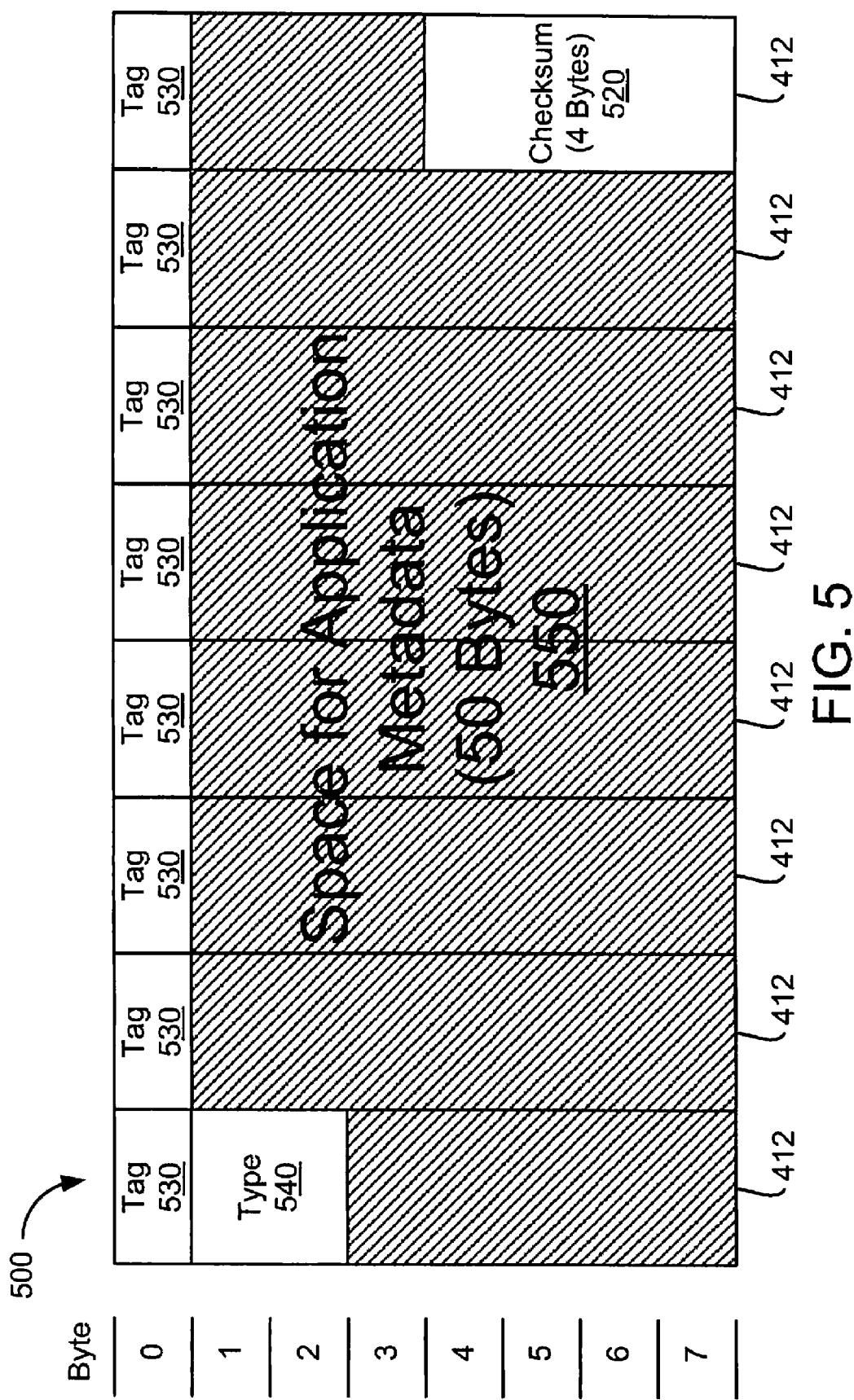
FIG. 5 is a schematic diagram illustrating an example data structure for a confluence of footers for providing high performance block storage (HPBS) metadata containing a write activity level (WAL) metric in accordance with the preferred embodiments of the present invention.

FIG. 5 is a schematic diagram illustrating another example data structure 500 for a confluence of footers for providing high performance block storage (HPBS) metadata containing a write activity level (WAL) metric in accordance with the preferred embodiments of the present invention.

A checksum is contained in the Checksum field (a Checksum field 520, discussed below) in the data structure 500 shown in FIG. 5. It is important to note that as utilized herein, including the claims, the term "checksum" is intended to encompass any type of hash function, including cyclic redundancy code (CRC).

A four-byte Checksum field 520 preferably covers all the data blocks 410 (shown in FIG. 4) and the footers 412 within the page 400 (shown in FIG. 4). Preferably, the Checksum field 520 occupies bytes 4-7 in the last footer 412 of the HPBS metadata unit 500. As noted above, the Checksum field 520 contains a checksum that is calculated using any suitable hash function, including a CRC. In addition, a Tag field 530 is included in each footer 412 of the HPBS metadata unit 500. The Tag field 530, which is described below with reference to FIG. 6, preferably is one byte and occupies byte 0 in each footer 412 of the HPBS metadata unit 500. Also, a Type field 540 is included in at least one of the footers 412 of the HPBS metadata unit 500. The Type field 540 specifies a metadata type number, which defines application metadata 550. For example, each software and/or hardware company may have its own metadata type number. Allocation of the metadata type numbers may be administered, for example, by an appropriate standards body. Preferably, the Type field 540 is two bytes and occupies bytes 1 and 2 in the first footer 412 of the HPBS metadata unit 500. The HPBS metadata unit 500, therefore, has 50 bytes of space available (shown as a hatched area in FIG. 5) for application metadata 550, which in accordance to the preferred embodiments of the present invention contains a WAL metric such as a write-activity-index value.

Figure 1:
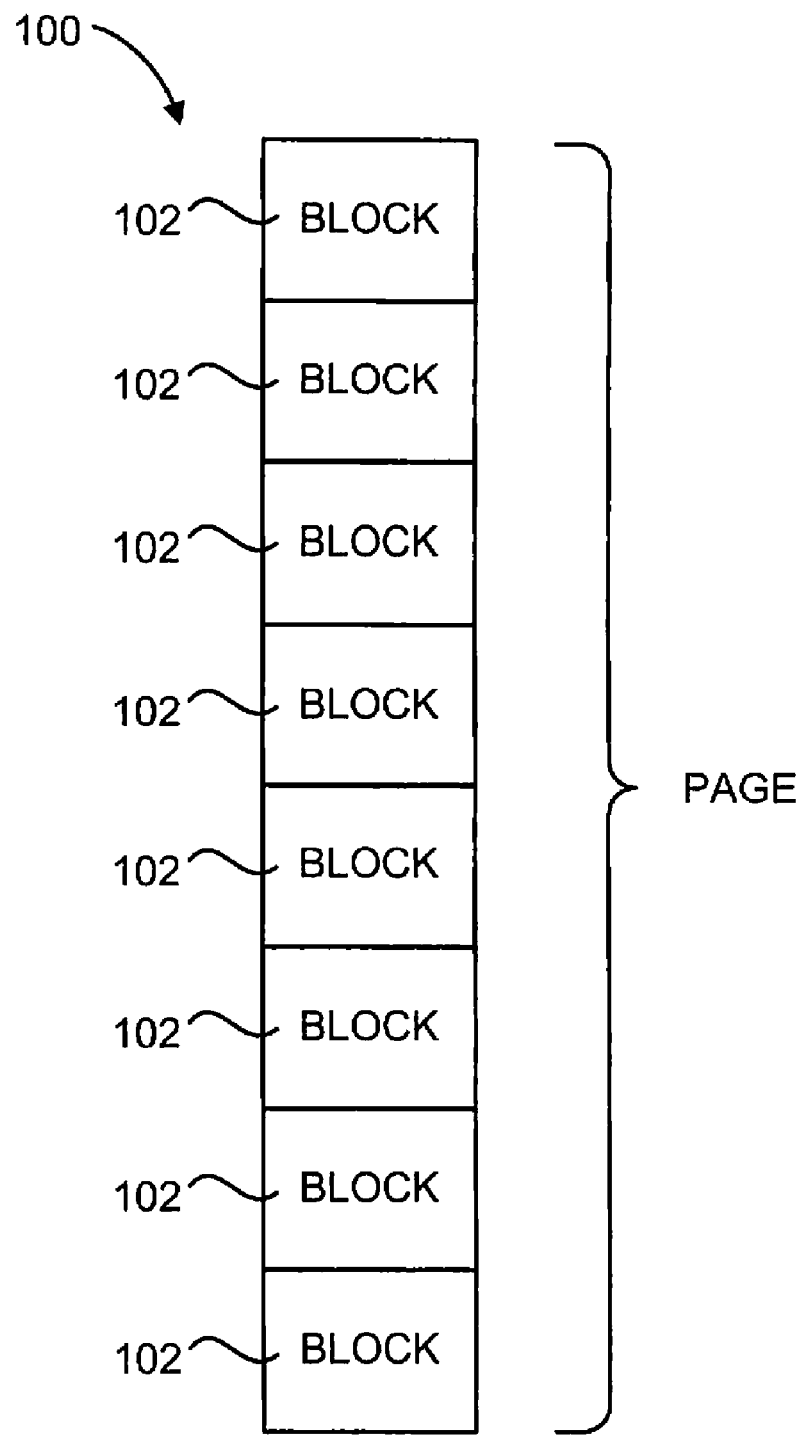
FIG. 1 is a schematic diagram illustrating an example data structure for a conventional sequence of fixed-size blocks that together define a page.
Figure 2:
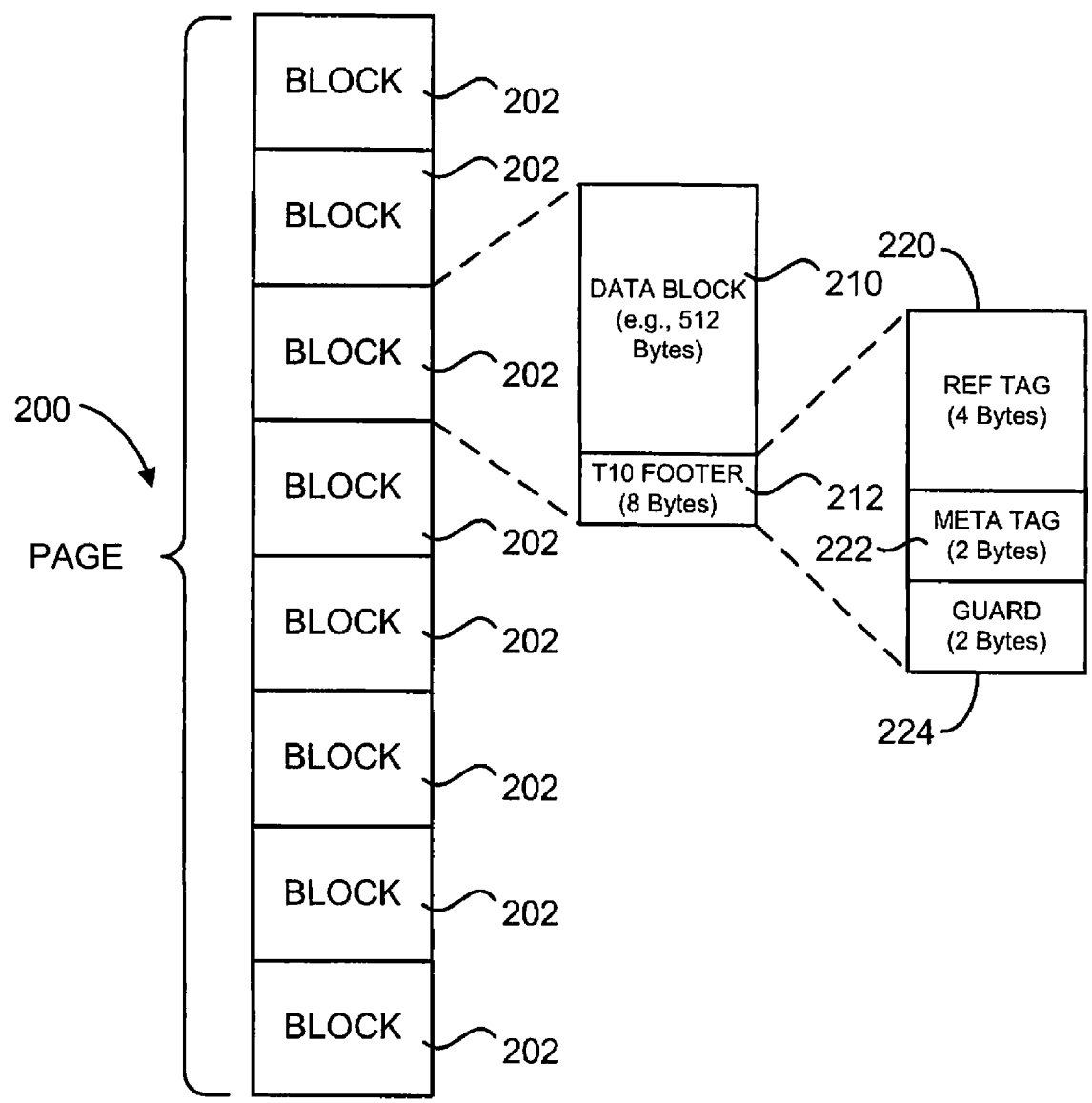
FIG. 2 is a schematic diagram illustrating an example data structure for a conventional sequence (i.e., page) of fixed-size blocks in accordance with the current T10 End-to-End (ETE) Data Protection architecture.

As noted above, one skilled in the art will appreciate that alternative data structures to the example data structure 500 shown in FIG. 5 may be used in accordance with the preferred embodiments of the present invention. For example, a checksum covering just the footers 412 may be utilized in lieu of the checksum 520, which covers both the data blocks 410 and the footers 412. Such an alternative data structure may, for example, cover the data blocks 410 by utilizing the T10 CRC, i.e., each footer in the confluence of footers that makes up the HPBS metadata unit includes a two-byte T10 CRC field. This two-byte T10 CRC field may, for example, contain the same contents as the Guard field 224 (shown in FIG. 2), which was discussed above with reference to the current T10 ETE Data Protection architecture. Such an alternative data structure is disclosed in U.S. Ser. No. 11/871,532, filed Oct. 12, 2007, entitled "METHOD, APPARATUS, COMPUTER PROGRAM PRODUCT, AND DATA STRUCTURE FOR PROVIDING AND UTILIZING HIGH PERFORMANCE BLOCK STORAGE METADATA", which is assigned to the assignee of the instant application and which is hereby incorporated herein by reference in its entirety.

FIG. 6 is a schematic diagram illustrating an example data structure for a Tag field, such as the Tag field 530 (shown in FIG. 5), in accordance with the preferred embodiments of the present invention. As mentioned above, the Tag field 530 is preferably one byte. In accordance with the preferred embodiments of the present invention, bit0 of the Tag field 530 contains a value that indicates whether or not the Tag field 530 is associated with the first fixed-size block of the page. For example, if bit0 of the Tag field 530 contains a "zero" value then the Tag field 530 is not the start of the page, or if bit0 of the Tag field 530 contains a "one" value then the Tag field 530 is the start of the page. Also, in accordance with the preferred embodiments of the present invention, bit7 through bit7 of the Tag field 530 contains a value that indicates the distance (expressed in blocks) to the last block in the page. Because the page preferably contains anywhere from 1 to 128 fixed-size blocks, bit1 through bit7 of the Tag field 530 will contain a value ranging from 0 to 127.

Figure 7:
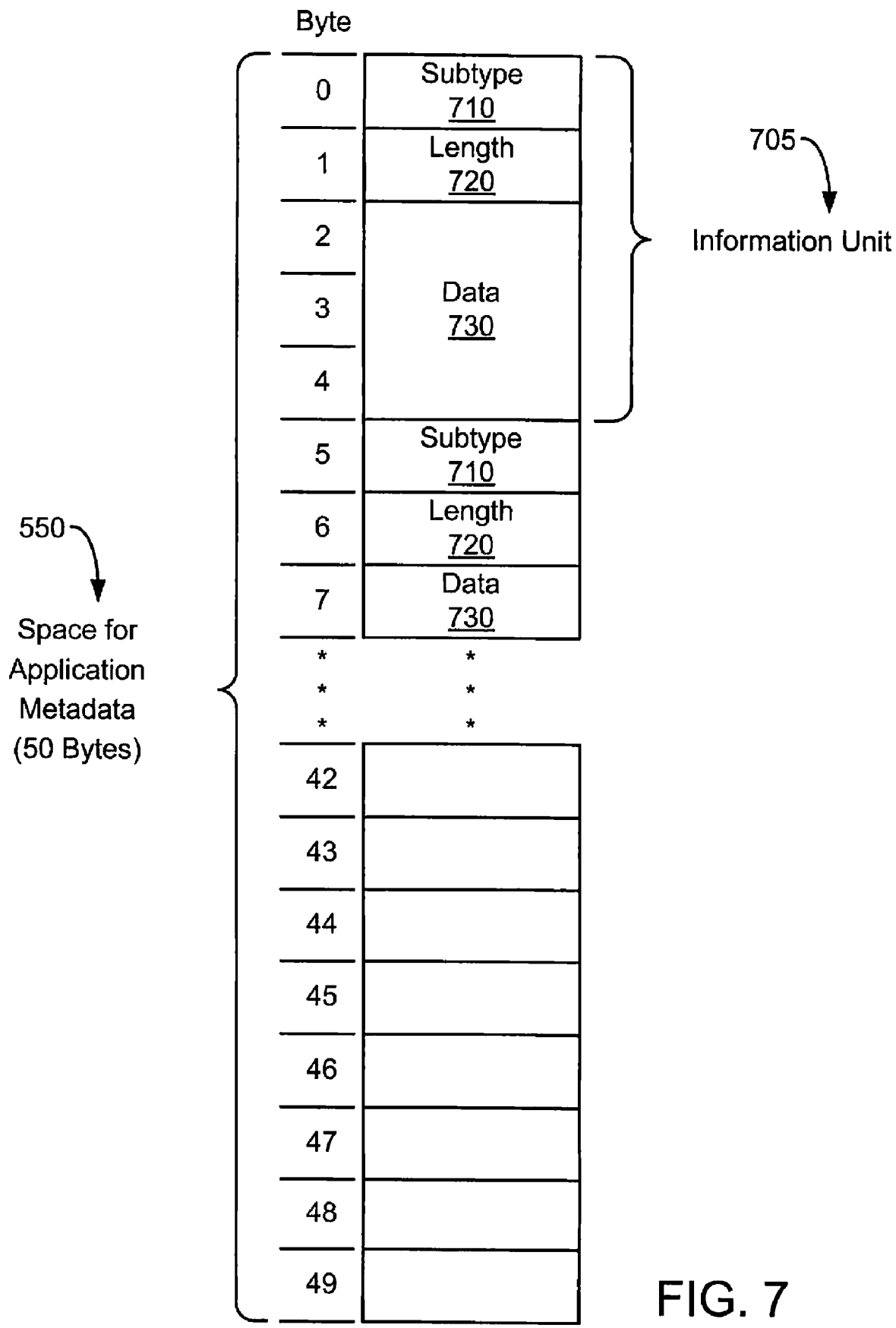
FIG. 7 is a schematic diagram illustrating an example data structure for application metadata containing a plurality of information units including a write activity level (WAL) metric in accordance with the preferred embodiments of the present invention.

FIG. 7 is a schematic diagram illustrating an example data structure for application metadata, such as the application metadata 550 (shown in FIG. 5), containing one or more information units including a WAL metric in accordance with the preferred embodiments of the present invention. At fifty bytes, the space available for application metadata 550 shown in FIG. 7 corresponds to the space available shown in FIG. 5. The data structure of the application metadata contained in the space 550 includes a series of one or more contiguous variable-sized Information Units (IUs) 705. Each IU 705 is of variable size and consists of a subtype field 710 (1 byte), a length of data field 720 (1 byte), and a data field 730 (0 to "n" bytes). Preferably, the subtypes values contained in the subtype field 710 are specific to the type value contained in the type field 540 (shown in FIG. 5) so that the same subtype value may have different meanings for different type values. For example, the type value may designate a software and/or hardware vendor, and the subtype value may designate the subtype may designate one or more platforms of the software and/or hardware vendor. This data structure provides a very flexible architecture for organizing a series of IUs associated with the page.

Figure 8:
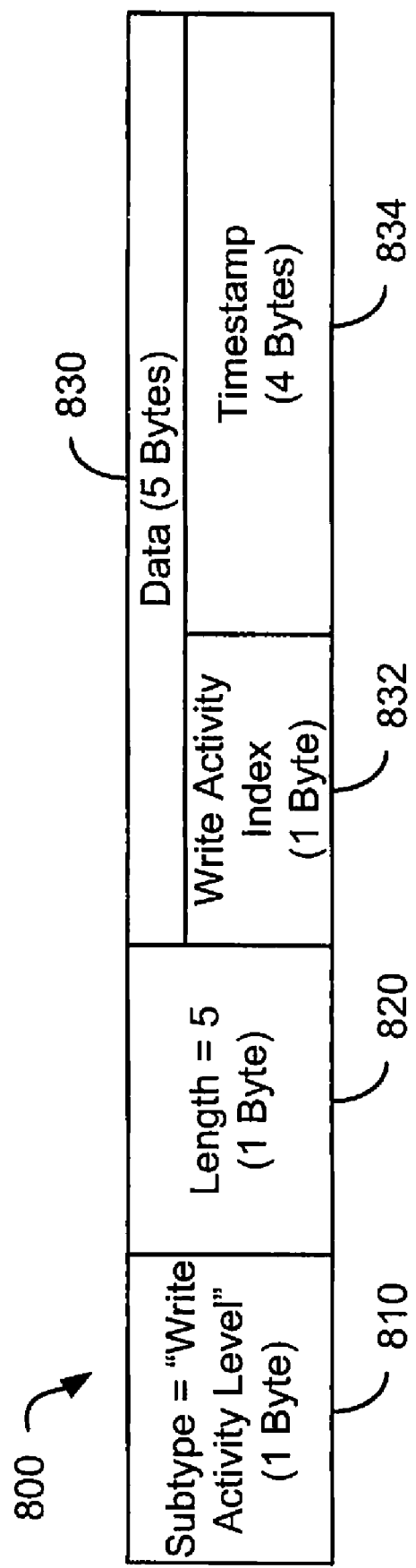
FIG. 8 is a schematic diagram illustrating an example data structure for an information unit including a write activity level (WAL) metric in accordance with the preferred embodiments of the present invention.

FIG. 8 is a schematic diagram illustrating an example data structure for an information unit 800 containing a write activity level (WAL) metric in accordance with the preferred embodiments of the present invention. The information unit 800 corresponds with one of the IUs 705 shown in FIG. 7. The information unit 800 includes a subtype field 810 (e.g., 1 byte) having a "write-activity-level" value, a length field 820 (e.g., 1 byte), and a data field 830 (e.g., 5 bytes). The length field 820 contains a value that indicates the length of the data field 830, i.e., 5 bytes. The data field 830 includes a "write-activity-index" field 832 (e.g., 1 byte), and a "timestamp" field 834 (e.g., 4 bytes). In accordance with the preferred embodiments of the present invention, the write-activity-index field 832 contains a "write-activity-index" value ranging from 0 "cold" to 127 "hot". In accordance with the preferred embodiments of the present invention, the write-activity-index value is computed by the providing mechanism 320

(shown in FIG. 3). Also in accordance with the preferred embodiments of the present invention, the timestamp field 834 contains a 32-bit number representing the number of seconds between Jan. 1, 2000 and the previous write operation.

Figure 9:
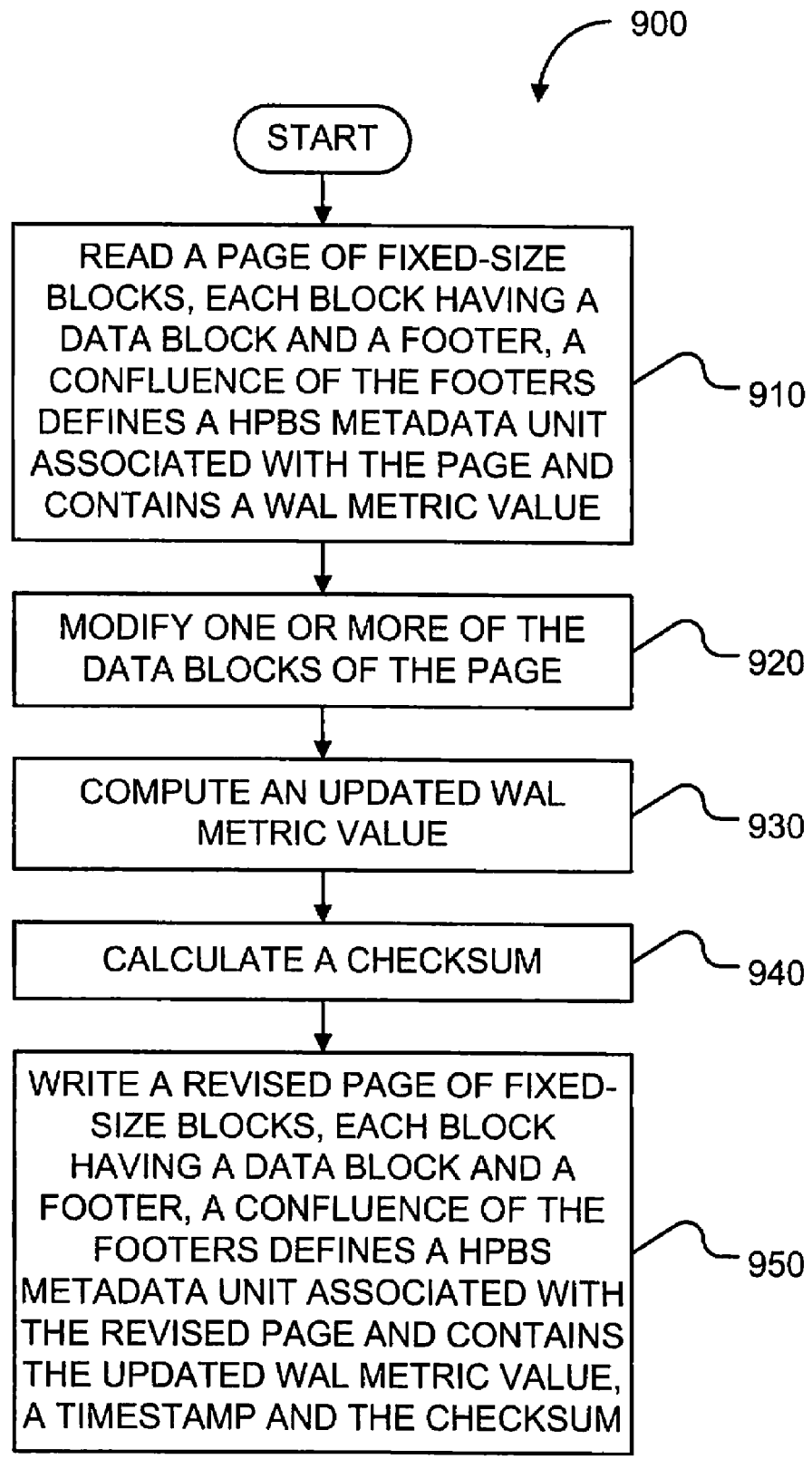
FIG. 9 is a flow diagram illustrating a method for providing high performance block storage (HPBS) metadata containing a write activity level (WAL) metric in accordance with the preferred embodiments of the present invention.

FIG. 9 is a flow diagram illustrating a method 900 for providing high performance block storage (HPBS) metadata containing a write activity level (WAL) metric in accordance with the preferred embodiments of the present invention. In the method 900, the steps discussed below (steps 910-950) are performed during a write operation. These steps are set forth in their preferred order. It must be understood, however, that the various steps may occur at different times relative to one another than shown, or may occur simultaneously. Moreover, those skilled in the art will appreciate that one or more of the steps may be omitted. In accordance with the preferred embodiments of the present invention, these steps are performed during a write operation by a mechanism for providing high performance block storage (HPBS) metadata containing a write activity level (WAL) metric (e.g., the providing mechanism 320 shown in FIG. 3).

The method 900 begins when a mechanism for providing high performance block storage (HPBS) metadata containing a write activity level (WAL) metric (e.g., in a computer system, storage subsystem, DASD, etc.) reads a page of fixed-size blocks, each block having a data block and a footer (step 910). For example, the step 910 may be performed when all of the fixed-size blocks and all of the footers of an entire page are read together in one operation in the computer system 300 (shown in FIG. 3), in the DASD 340, 340' (shown in FIG. 3), and/or in the storage subsystem 362 (shown in FIG. 3).

In accordance with the preferred embodiments of the present invention, a high performance block storage (HPBS) metadata unit (e.g., the HPBS metadata unit 500 shown in FIG. 5) is created from a confluence of the footers as part of or subsequent to this reading step 910. The high performance block storage (HPBS) metadata unit is associated with the page and contains a write activity level (WAL) metric, which was recorded during a previous write operation (i.e., before the current write operation). In accordance with the preferred embodiments of the present invention, the write activity level (WAL) metric includes a write-activity-index value ranging from 0 "cold" to 127 "hot" (which was calculated and recorded during the previous write operation) and a timestamp, i.e., a 32-bit number representing the number of seconds between Jan. 1, 2000 and the previous write operation (which was calculated and recorded during the previous write operation). Initially, the write-activity-index value may be an initialization value, e.g., 0 "cold". The write-activity-index value and the timestamp are each preferably contained in a single information unit (e.g., the information unit 800 shown in FIG. 8) within the HPBS metadata unit's space for application metadata (550 in FIG. 5).

The method 900 employs the value in the information unit's subtype field (810 in FIG. 8) to identify the information unit as a "Write Activity Level" subtype information unit, and hence distinguish the information unit from other information unit subtypes that may be contained in the HPBS metadata unit's space for application metadata. Likewise, the method 900 utilizes the value in the information unit's length field (820 in FIG. 8) to identify the length of the data field (830 in FIG. 8) that follows the length field.

Next, the method 900 modifies one or more of the data blocks of the page (step 920). This modifying step 920 is conventional in the sense that one or more of the data blocks of the page of fixed-size blocks read into memory during the reading step 910 is/are modified in the memory according to the current write operation. The step 920 may be performed in the computer system 300 (shown in FIG. 3), in the DASD 340, 340' (shown in FIG. 3), and/or in the storage subsystem 362 (shown in FIG. 3).

The method 900 continues by computing an updated write activity level (WAL) metric value (step 930). The write activity level (WAL) metric value is updated every time a page is written. For example, the write-activity-index value changes over time as the activity level changes. In accordance with the preferred embodiments of the present invention, the write-activity-index value is updated during step 930 by calculating the time delta since the previous write operation and then using the time delta to determine the value to increment or decrement the write-activity-index value (e.g., according to a write-activity-index increment function such as that described below with respect to FIG. 10). Thus, in accordance with the preferred embodiments of the present invention, the write-activity-index value associated with a page having a high level of write activity will be incremented until it hits the maximum, i.e., write-activity-index value=127. On the other hand, the write-activity-index value associated with a page having a low level of write activity will be decremented over time to the minimum, i.e., write-activity-index value=0. The simple write-activity-index increment function shown in FIG. 10 can be used to calculate the incremental value and is characterized by the maximum index increment $I_{max}$, the minimum index increment $-I_{min}$, the high-frequency time delta $T_1$, and low-frequency time delta $T_2$. These values can be dynamically tuned/optimized to a particular system and workload. The simple write-activity-index increment function shown in FIG. 10 is exemplary. One skilled in the art will appreciate that other functions, including more complex write-activity-index increment functions, may be utilized in lieu of the write-activity-index increment function shown in FIG. 10.

In addition, the timestamp changes to reflect the timing of the current write operation. In accordance with the preferred embodiments of the present invention, the timestamp is updated during step 930 to a 32-bit number representing the number of seconds between Jan. 1, 2000 and the current write operation. The step 930 may be performed in the computer system 300 (shown in FIG. 3), in the DASD 340, 340' (shown in FIG. 3), and/or in the storage subsystem 362 (shown in FIG. 3)

Next, the method 900 continues by calculating an appropriate checksum (step 940). For example, if the T10 CRC fields have not been retained in the HPBS metadata unit (as in the HPBS metadata unit 500 shown in FIG. 5), the checksum is calculated to cover all data (including the one or more data blocks as modified in step 920) and footers (including the write activity level (WAL) metric value as updated in step 930—more specifically, the updated write-activity-index value and the updated timestamp) within the page. The checksum may be calculated using any suitable hash function, including a CRC. The step 940 may be performed in the computer system 300 (shown in FIG. 3), in the DASD 340, 340' (shown in FIG. 3), and/or in the storage subsystem 362 (shown in FIG. 3).

The method 900 continues by writing a sequence of fixed-size blocks that together define a revised page to a data storage medium (e.g, a magnetic disk in the DASD 340, 340' in FIG. 3 and/or in the storage subsystem 362 in FIG. 3), each of the fixed-size blocks of the revised page having a data block and a footer (step 950). In accordance with the preferred embodiments of the present invention, the revised page includes the one or more data blocks modified in step 920, the write activity level (WAL) metric value as updated in step 930, and the checksum as calculated in step 940. A confluence of the footers defines a high performance block storage (HPBS) metadata unit that is associated with the revised page and that contains the write activity level (WAL) metric value as updated in step 930 (i.e, the updated write-activity-index value and the updated timestamp) as well as the checksum as calculated in step 940. The step 950 may be performed in the computer system 300 (shown in FIG. 3), in the DASD 340, 340' (shown in FIG. 3), and/or in the storage subsystem 362 (shown in FIG. 3).

Figure 10:
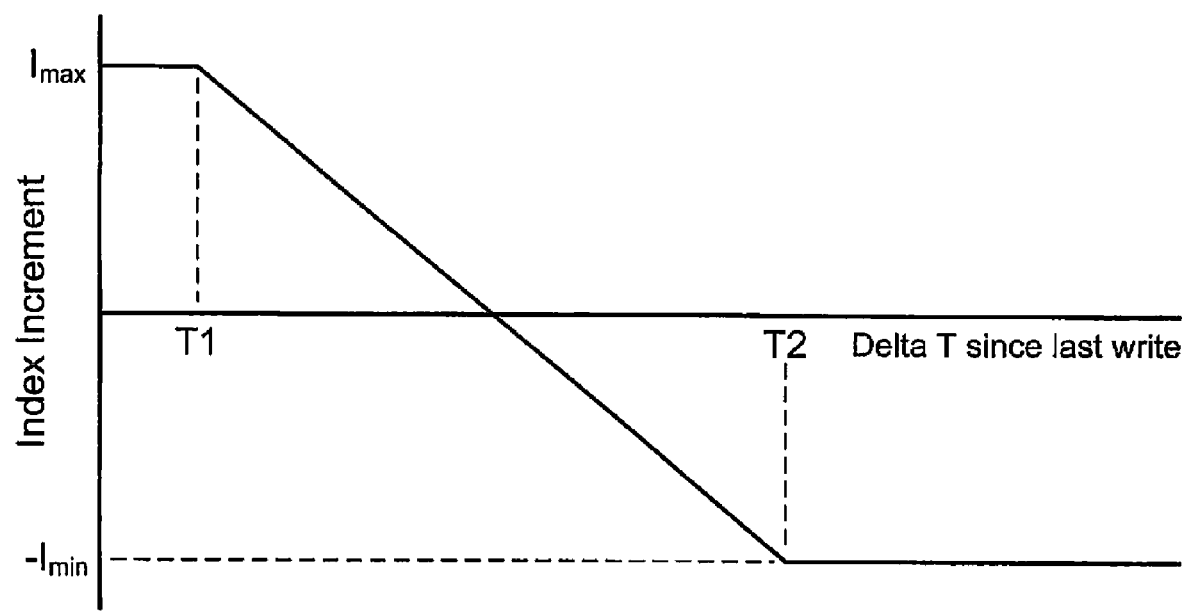
FIG. 10 is a graphical diagram illustrating an exemplary technique for determining a WAL metric in accordance with the preferred embodiments of the present invention.

FIG. 10 is a graphical diagram illustrating an exemplary technique for determining a WAL metric in accordance with the preferred embodiments of the present invention. As described briefly above, in accordance with the preferred embodiments of the present invention, the write-activity-index value is updated by calculating the time delta since the previous write operation and then using the time delta to determine the value to increment or decrement the write-activity-index value (e.g., according to a write-activity-index increment function shown in FIG. 10). Thus, in accordance with the preferred embodiments of the present invention, the write-activity-index value associated with a page that has a high level of write activity will be incremented until it hits the maximum, i.e., write-activity-index value=127. On the other hand, the write-activity-index value associated with a page that has a low level of write activity will be decremented over time to the minimum, i.e., write-activity-index value=0.

The simple write-activity-index increment function shown in FIG. 10 can be used to calculate the incremental value and in an illustrative example is characterized by the maximum index increment $I_{max}$=+20, the minimum index increment $-I_{min}$=-127, the high-frequency time delta $T_1$,=5 sec, and low-frequency time delta $T_2$=24 hr. One skill in the art will appreciate that the particular values used in this illustrative example are exemplary and can be tuned/optimized (statically or on-the-fly) to a particular system and workload.

In a first example, if a page is read in step 910 and the write-activity-index field (832 in FIG. 8) is found to contain a write-activity-index value=50, and the time delta is calculated to be 1 sec, then based on the write-activity-index increment function shown in FIG. 10 the write-activity-index value is incremented by the maximum index increment $I_{max}$=+20 so that the updated write-activity-index value=70 (i.e., 50+20).

In a second example, if a page is read in step 910 and the write-activity-index field (832 in FIG. 8) is found to contain a write-activity-index value=50, and the time delta is calculated to be 1 hr, then based on the write-activity-index increment function shown in FIG. 10 the write-activity-index value is incremented by the index increment I=+6 so that the updated write-activity-index value=56 (i.e., 50+6).

In a third example, if a page is read in step 910 and the write-activity-index field (832 in FIG. 8) is found to contain a write-activity-index value=50, and the time delta is calculated to be 36 hr, then based on the write-activity-index increment function shown in FIG. 10 the write-activity-index value is decremented by the minimum index increment $-I_{min}$=-127 so that the updated write-activity-index value=0 (i.e., 50-127=-77, but the write-activity-index value must be within the range from 0 "cold" to 127 "hot").

In a fourth example, if a page is read in step 910 and the write-activity-index field (832 in FIG. 8) is found to contain a write-activity-index value=110, and the time delta is calculated to be 1 sec, then based on the write-activity-index increment function shown in FIG. 10 the write-activity-index value is incremented by the maximum index increment $I_{max}$=+20 so that the updated write-activity-index value=127 (i.e., 110+20=130, but the write-activity-index value must be within the range from 0 "cold" to 127 "hot").

Figure 11:
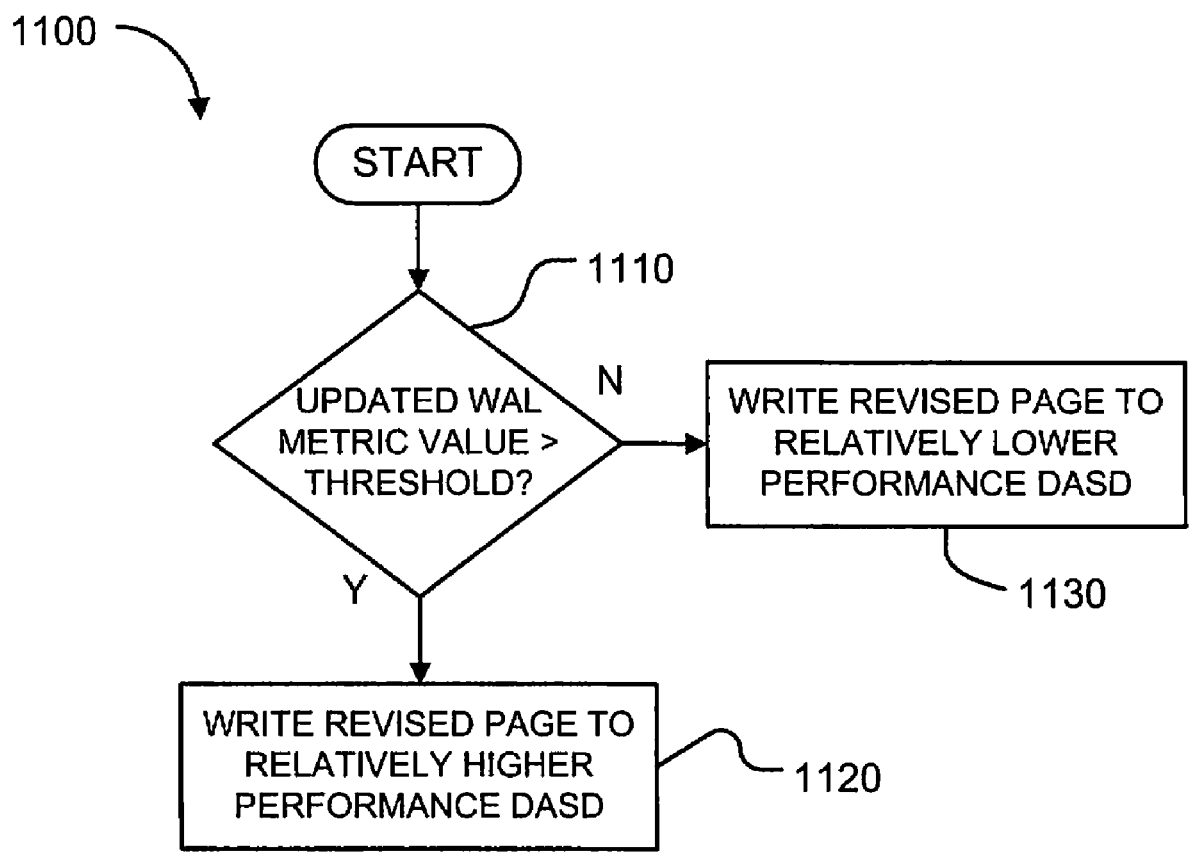
FIG. 11 is a flow diagram illustrating a method for utilizing high performance block storage metadata containing a write activity level (WAL) metric in accordance with the preferred embodiments of the present invention.

FIG. 11 is a flow diagram illustrating a method 1100 for utilizing high performance block storage metadata containing a write activity level (WAL) metric in accordance with the preferred embodiments of the present invention. In the method 1100, the steps discussed below (steps 1110-1130) are performed during a write operation. These steps are set forth in their preferred order. It must be understood, however, that the various steps may occur at different times relative to one another than shown, or may occur simultaneously. Moreover, those skilled in the art will appreciate that one or more of the steps may be omitted. In accordance with the preferred embodiments of the present invention, these steps are performed during a write operation by a mechanism for utilizing high performance block storage (HPBS) metadata containing a write activity level (WAL) metric (e.g., the utilizing mechanism 326 shown in FIG. 3). In this regard, the utilizing mechanism 326 (shown in FIG. 3) may be implemented together with the providing mechanism 320 (shown in FIG. 3) so that the steps of method 1100 may be performed as part of the writing step 950 of method 900 (shown in FIG. 9).

The method 1100 begins when a mechanism for utilizing high performance block storage (HPBS) metadata containing a write activity level (WAL) metric (e.g., in a computer system, storage subsystem, DASD, etc.) determines whether the updated write activity level (WAL) metric value calculated in step 930 (shown in FIG. 9) is greater than a threshold value (step 1110). For example, the step 1110 may compare the updated write-activity-index value calculated in step 930 (shown in FIG. 9) to a threshold write-activity-index value (e.g., assuming an exemplary threshold write-activity-index value=65; if the updated write-activity-index value>65 then the utilizing mechanism deems the page "hot", or if the updated write-activity-index value≦65 then the utilizing mechanism deems the page "cold". One skilled in the art will appreciate that further gradations of "hotness" (e.g., "very hot", "hot", "warm", "cold", and "very cold") are possible with intermediate threshold values.

If the updated write activity level (WAL) metric value calculated in step 930 (shown in FIG. 9) is greater than the threshold value, then the utilizing mechanism deems the page associated with the updated write activity level (WAL) metric value to be "hot" and maps the page to a higher performance physical disk (step 1120). For example, if the updated write-activity-index value=70 and the threshold write-activity-index value=65, then the utilizing mechanism deems the page associated with the updated write-activity-index value to be "hot" and in step 1120 maps the page to a higher performance physical disk (e.g., DASD 340 in FIG. 3).

On the other hand, if the updated write activity level (WAL) metric value calculated in step 930 (shown in FIG. 9) is less than or equal to the threshold value, then the utilizing mechanism deems the page associated with the updated write activity level (WAL) metric value to be "cold" and maps the page to a low power (and lower performance) physical disk (step 1130). For example, if the updated write-activity-index value=56 and the threshold write-activity-index value=65, then the utilizing mechanism deems the page associated with the updated write-activity-index value to be "cold" and in step 1130 maps the page to a low power (and lower performance) physical disk (e.g., DASD 340' in FIG. 3).

As noted above, mapping the more frequently accessed logical unit numbers (LUNs) and pages to high performance physical disks permits the more frequently accessed data, which typically comprise a small proportion of the overall data, to be quickly accessed (without disadvantageously mapping the infrequently accessed data, which typically make up most of the overall data, to these same power hungry physical disks). Moreover, mapping the infrequently accessed LUNs and pages to low power (and lower performance) physical disks minimizes power requirements for storing this infrequently accessed data, which typically make up most of the overall data (without disadvantageously mapping the more frequently accessed data to these same performance robbing physical disks).

Figure 12:
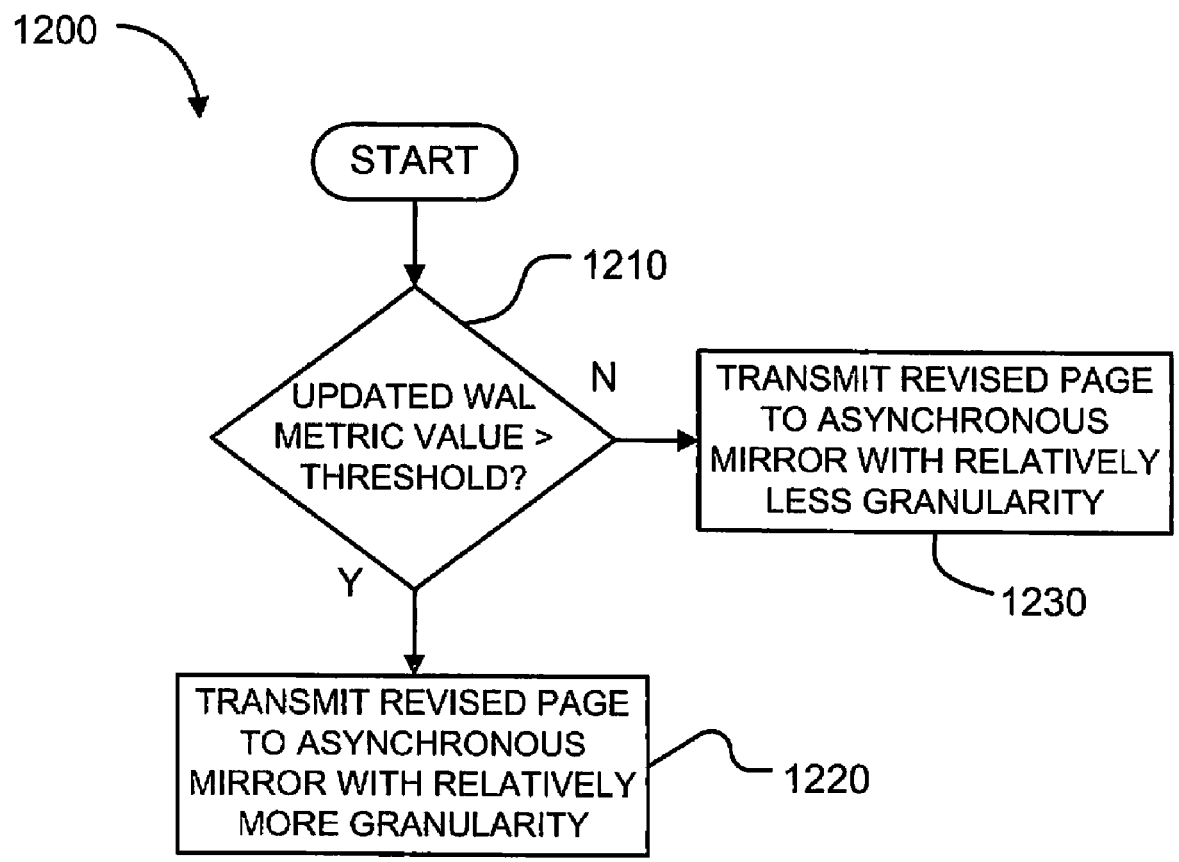
FIG. 12 is a flow diagram illustrating another method for utilizing high performance block storage metadata containing a write activity level (WAL) metric in accordance with the preferred embodiments of the present invention.

FIG. 12 is a flow diagram illustrating a method 1200 for utilizing high performance block storage metadata containing a write activity level (WAL) metric in accordance with the preferred embodiments of the present invention. In the method 1200, the steps discussed below (steps 1210-1230) are performed when copying data to a remote asynchronous mirror. These steps are set forth in their preferred order. It must be understood, however, that the various steps may occur at different times relative to one another than shown, or may occur simultaneously. Moreover, those skilled in the art will appreciate that one or more of the steps may be omitted. In accordance with the preferred embodiments of the present invention, these steps are performed by a mechanism for utilizing high performance block storage (HPBS) metadata containing a write activity level (WAL) metric (e.g., the utilizing mechanism 326 shown in FIG. 3). In this regard, the utilizing mechanism 326 (shown in FIG. 3) may be implemented together with the providing mechanism 320 (shown in FIG. 3) so that the steps of method 1200 may be performed as part of the writing step 950 of method 900 (shown in FIG. 9).

It is well known that a central processing unit (CPU) randomly and sequentially updates one or more data storage volumes in an attached storage subsystem (e.g., the storage subsystem 362 shown in FIG. 3). It is further known that remote electronic copying of data storage volumes is a frequently used strategy for maintenance of continuously available information systems in the presence of a fault or failure of system components. Among several copy techniques, mirroring is often favored over point-in-time copying because a data mirror may be quickly substituted for an unavailable primary volume.

Conventionally, volume-to-volume mirroring from a primary volume to a data mirror volume is accomplished either synchronously or asynchronously. Synchronous mirroring can be made transparent to applications on the CPU and incur substantially no CPU overhead by direct control unit to control unit copying. However, completion of a write or update is not given to the host until the write or update is completed at both the primary mirror volume and the synchronous mirror volume. In contrast, asynchronous mirroring allows the CPU access rate of the primary volume to perform independent of the mirror copying. The CPU may, however, incur copy management overhead.

U.S. Pat. No. 7,225,307, issued May 29, 2007, entitled "APPARATUS, SYSTEM, AND METHOD FOR SYNCHRONIZING AN ASYNCHRONOUS MIRROR VOLUME USING A SYNCHRONOUS MIRROR VOLUME", which is assigned to the assignee of the instant application and which is hereby incorporated herein by reference in its entirety, discloses a mechanism for synchronizing an asynchronous mirror volume using a synchronous mirror volume by tracking change information when data is written to a primary volume and not yet written to an asynchronous mirror. The change information is stored on both the primary storage system and the synchronous mirror system. In the event the primary storage system becomes unavailable, the asynchronous mirror is synchronized by copying data identified by the change information stored in the synchronous mirror system and using the synchronous mirror as the copy data source.

The method 1200 begins when a mechanism for utilizing high performance block storage (HPBS) metadata containing a write activity level (WAL) metric (e.g., in a computer system, storage subsystem, DASD, etc.) determines whether the updated write activity level (WAL) metric value calculated in step 930 (shown in FIG. 9) is greater than a threshold value (step 1210). For example, the step 1210 may compare the updated write-activity-index value calculated in step 930 (shown in FIG. 9) to a threshold write-activity-index value (e.g., assuming an exemplary threshold write-activity-index value=65; if the updated write-activity-index value>65 then the utilizing mechanism deems the page "hot", or if the updated write-activity-index value<65 then the utilizing mechanism deems the page "cold". One skilled in the art will appreciate that further gradations of "hotness" (e.g., "very hot", "hot", "warm", "cold", and "very cold") are possible with intermediate threshold values.

If the updated write activity level (WAL) metric value calculated in step 930 (shown in FIG. 9) is greater than the threshold value, then the utilizing mechanism deems the page associated with the updated write activity level (WAL) metric value to be "hot" and transmits the page to a remote asynchronous mirror with relatively more granularity (step 1220). For example, if the updated write-activity-index value=70 and the threshold write-activity-index value=65, then the utilizing mechanism deems the page associated with the updated write-activity-index value to be "hot" and in step 1220 transmits the page to a remote asynchronous mirror (e.g., the storage subsystem 362 in FIG. 3) with relatively more granularity. As an illustrative example, "hot" sections of a logical unit number (LUN) written to a primary volume may be transmitted to an asynchronous mirror more frequently (i.e., at a finer level of writes) than "colder" sections.

On the other hand, if the updated write activity level (WAL) metric value calculated in step 930 (shown in FIG. 9) is less than or equal to the threshold value, then the utilizing mechanism deems the page associated with the updated write activity level (WAL) metric value to be "cold" and transmits the page to a remote asynchronous mirror with relatively less granularity (step 1230). For example, if the updated write-activity-index value=56 and the threshold write-activity-index value=65, then the utilizing mechanism deems the page associated with the updated write-activity-index value to be "cold" and in step 1230 transmits the page to a remote asynchronous mirror (e.g., the storage subsystem 362 in FIG. 3) with relatively less granularity. As an illustrative example, "cold" sections of a logical unit number (LUN) written to a primary volume may be transmitted to an asynchronous mirror less frequently (i.e., at a courser level of writes) than "hotter" sections.

Transmitting hot/cold sections of a logical unit number (LUN) to a remote asynchronous mirror with more/less granularity optimizes memory, makes optimal use of the available communications line bandwidth, and decreases the lag time between the two copies (i.e., the synchronous copy and the remote asynchronous copy).

One skilled in the art will appreciate that many variations are possible within the scope of the present invention. For example, while the preferred embodiments of the present invention are described in the context of a write operation, one skilled in the art will appreciate that the present invention is also applicable in the context of other access operations, e.g., a read operation. Thus, while the present invention has been particularly shown and described with reference to preferred embodiments thereof, it will be understood by those skilled in the art that these and other changes in form and details may be made therein without departing from the spirit and scope of the present invention.

What is claimed is:

1. A computer-implemented method for providing high performance block storage metadata containing a write activity level metric for data storage performance enhancement, comprising the steps of:

reading a sequence of fixed-size blocks that together define a page, each of the fixed-size blocks comprising a data block and a footer, wherein a confluence of the footers defines a high performance block storage metadata unit that is associated with the page, wherein each footer in the confluence of the footers includes space for application metadata, wherein the space for application metadata in the confluence of the footers includes one or more information units each spanning across at least two of the footers in the confluence of the footers from one of the footers to another of the footers and each of the information units comprising a subtype field, a length field, and a data field, wherein the subtype field distinguishes between different types of the information units, and wherein the high performance block storage metadata unit contains a write activity level metric value, a write timestamp, and a Checksum field;

modifying one or more of the data blocks of the page;

computing an updated write activity level metric value based on the write activity level metric value read from the high performance block storage metadata unit and a time elapsed since a previous write, wherein the step of computing the updated write activity level metric value includes the steps of:

calculating a time elapsed since a previous write by comparing a current time and the write timestamp read from the high performance block storage metadata unit;

incrementing or decrementing the write activity level metric value read from the high performance block storage metadata unit based on the time elapsed since the previous write calculated in the calculating step;

calculating a checksum of all of the data blocks and all of the footers of the entirety of the sequence of fixed-size blocks that together define the revised page, whereby the checksum incorporates the one or more data blocks modified in the modifying step, the updated write activity level metric value, and the current time;

writing a sequence of fixed-size blocks that together define a revised page to a data storage medium, each of the fixed-size blocks of the revised page comprising a data block and a footer, wherein the revised page includes the one or more data blocks modified in the modifying step, wherein a confluence of the footers defines a high performance block storage metadata unit associated with the revised page, wherein each footer in the confluence of the footers includes space for application metadata, wherein the space for application metadata in the confluence of the footers includes one or more information units each spanning across at least two of the footers in the confluence of the footers from one of the footers to another of the footers and each of the information units comprising a subtype field, a length field, and a data field, wherein the subtype field distinguishes between different types of the information units, wherein the high performance block storage metadata unit associated with the revised page contains the updated write activity level metric value, and wherein the step of writing the sequence of fixed-size blocks that together define the revised page to the data storage medium includes the steps of:

writing the updated write activity level metric value and the current time within one or more information units contained in the high performance block storage metadata unit associated with the revised page;

writing the checksum calculated in the calculating step into the Checksum field contained in the high performance block storage metadata unit associated with the revised page.

2. The computer-implemented method as recited in claim 1, wherein the step of writing the sequence of fixed-size blocks that together define the revised page to the data storage medium includes the steps of:

comparing the updated write activity level metric value to a threshold value, wherein any updated write activity level metric value greater than the threshold value is indicative of the revised page having a relatively higher write frequency;

writing the revised page to a disk drive having at least one of relatively higher performance and relatively higher power consumption if the updated write activity level metric value is greater than the threshold value;

writing the revised page to a disk drive having at least one of relatively lower performance and relatively lower power consumption if the updated write activity level metric value is less than the threshold value.

3. The computer-implemented method as recited in claim 1, wherein the step of writing the sequence of fixed-size blocks that together define the revised page to the data storage medium includes the steps of:

comparing the updated write activity level metric value to a threshold value, wherein any updated write activity level metric value greater than the threshold value is indicative of the revised page having a relatively higher write frequency;

transmitting the revised page to a remote asynchronous mirror with relatively more granularity if the updated write activity level metric value is greater than the threshold value as compared to if the updated write level metric value is less than the threshold value.

4. A data processing system, comprising:

a processor;

a memory coupled to the processor, the memory encoded with instructions that when executed by the processor comprise the steps of:

reading a sequence of fixed-size blocks that together define a page, each of the fixed-size blocks comprising a data block and a footer, wherein a confluence of the footers defines a high performance block storage metadata unit that is associated with the page, wherein each footer in the confluence of the footers includes space for application metadata, wherein the space for application metadata in the confluence of the footers includes one or more information units each spanning across at least two of the footers in the confluence of the footers from one of the footers to another of the footers and each of the information units comprising a subtype field, a length field, and a data field, wherein the subtype field distinguishes between different types of the information units, and wherein the high performance block storage metadata unit contains a write activity level metric value, a write timestamp, and a Checksum field;

modifying one or more of the data blocks of the page;

computing an updated write activity level metric value based on the write activity level metric value read from the high performance block storage metadata unit and a time elapsed since a previous write, wherein the step of computing the updated write activity level metric value includes the steps of:

calculating a time elapsed since a previous write by comparing a current time and the write timestamp read from the high performance block storage metadata unit;

incrementing or decrementing the write activity level metric value read from the high performance block storage metadata unit based on the time elapsed since the previous write calculated in the calculating step;

calculating a checksum of all of the data blocks and all of the footers of the entirety of the sequence of fixed-size blocks that together define the revised page, whereby the checksum incorporates the one or more data blocks modified in the modifying step, the updated write activity level metric value, and the current time;

writing a sequence of fixed-size blocks that together define a revised page to a data storage medium, each of the fixed-size blocks of the revised page comprising a data block and a footer, wherein the revised page includes the one or more data blocks modified in the modifying step, wherein a confluence of the footers defines a high performance block storage metadata unit associated with the revised page, wherein each footer in the confluence of the footers includes space for application metadata, wherein the space for application metadata in the confluence of the footers includes one or more information units each spanning across at least two of the footers in the confluence of the footers from one of the footers to another of the footers and each of the information units comprising a subtype field, a length field, and a data field, wherein the subtype field distinguishes between different types of the information units, wherein the high performance block storage metadata unit associated with the revised page contains the updated write activity level metric value, and wherein the step of writing the sequence of fixed-size blocks that together define the revised page to the data storage medium includes the steps of:

writing the updated write activity level metric value and the current time within one or more information units contained in the high performance block storage metadata unit associated with the revised page;

writing the checksum calculated in the calculating step into the Checksum field contained in the high performance block storage metadata unit associated with the revised page.

5. The data processing system as recited in claim 4, further comprising:
a server system;
wherein the server system includes an instance of the processor and the memory.

6. The data processing system as recited in claim 4, further comprising:
a storage subsystem;
wherein the storage subsystem includes at least one disk drive and an instance of the processor and the memory, wherein the footers are stored with the data blocks on a disk of the disk drive.

7. The data processing system as recited in claim 4, further comprising:
a server system;
a storage subsystem, and
wherein the server system and the storage subsystem are configured to enable communication therebetween,
wherein the server system and the storage subsystem each include an instance of the processor and the memory,
wherein the storage subsystem includes at least one disk drive, and wherein the footers are stored with the data blocks on a disk of the disk drive.

8. The data processing system as recited in claim 4, further comprising:
a server system having an instance of the processor and the memory;
a first disk drive having at least one of relatively higher performance and relatively higher power consumption;
a second disk drive having at least one of relatively lower performance and relatively lower power consumption;
wherein the server system, the first disk drive and the second disk drive are configured to enable communication therebetween;
wherein the step of writing the sequence of fixed-size blocks that together define the revised page to the data storage medium includes the steps of:
comparing the updated write activity level metric value to a threshold value, wherein any updated write activity level metric value greater than the threshold value is indicative of the revised page having a relatively higher write frequency;
writing the revised page to the first disk drive if the updated write activity level metric value is greater than the threshold value;
writing the revised page to the second disk drive if the updated write activity level metric value is less than the threshold value.

9. The data processing system as recited in claim 4, further comprising:
a server system having an instance of the processor and the memory;
a remote asynchronous mirror;
wherein the server system and the remote asynchronous mirror are configured to enable communication therebetween;
wherein the step of writing the sequence of fixed-size blocks that together define the revised page to the data storage medium includes the steps of:
comparing the updated write activity level metric value to a threshold value, wherein any updated write activity level metric value greater than the threshold value is indicative of the revised page having a relatively higher write frequency;
transmitting the revised page to the remote asynchronous mirror with relatively more granularity if the updated write activity level metric value is greater than the threshold value as compared to if the updated write level metric value is less than the threshold value.

10. A computer program product for providing high performance block storage metadata containing a write activity level metric for data storage performance enhancement in a digital computing device having at least one processor, comprising:
a plurality of executable instructions recorded on a non-transitory computer readable storage media, wherein the executable instructions, when executed by the at least one processor, cause the digital computing device to perform the steps of:
reading a sequence of fixed-size blocks that together define a page, each of the fixed-size blocks comprising a data block and a footer, wherein a confluence of the footers defines a high performance block storage metadata unit that is associated with the page, wherein each footer in the confluence of the footers includes space for application metadata, wherein the space for application metadata in the confluence of the footers includes one or more information units each spanning across at least two of the footers in the confluence of the footers from one of the footers to another of the footers and each of the information units comprising a subtype field, a length field, and a data field, wherein the subtype field distinguishes between different types of the information units, and wherein the high performance block storage metadata unit contains a write activity level metric value, a write timestamp, and a Checksum field;

modifying one or more of the data blocks of the page;

computing an updated write activity level metric value based on the write activity level metric value read from the high performance block storage metadata unit and a time elapsed since a previous write, wherein the step of computing the updated write activity level metric value includes the steps of:

calculating a time elapsed since a previous write by comparing a current time and the write timestamp read from the high performance block storage metadata unit;

incrementing or decrementing the write activity level metric value read from the high performance block storage metadata unit based on the time elapsed since the previous write calculated in the calculating step;

calculating a checksum of all of the data blocks and all of the footers of the entirety of the sequence of fixed-size blocks that together define the revised page, whereby the checksum incorporates the one or more data blocks modified in the modifying step, the updated write activity level metric value, and the current time;

writing a sequence of fixed-size blocks that together define a revised page to a data storage medium, each of the fixed-size blocks of the revised page comprising a data block and a footer, wherein the revised page includes the one or more data blocks modified in the modifying step, wherein a confluence of the footers defines a high performance block storage metadata unit associated with the revised page, wherein each footer in the confluence of the footers includes space for application metadata, wherein the space for application metadata in the confluence of the footers includes one or more information units each spanning across at least two of the footers in the confluence of the footers from one of the footers to another of the footers and each of the information units comprising a subtype field, a length field, and a data field, wherein the subtype field distinguishes between different types of the information units, wherein the high performance block storage metadata unit associated with the revised page contains the updated write activity level metric value, and wherein the step of writing the sequence of fixed-size blocks that together define the revised page to the data storage medium includes the steps of:

writing the updated write activity level metric value and the current time within one or more information units contained in the high performance block storage metadata unit associated with the revised page;

writing the checksum calculated in the calculating step into the Checksum field contained in the high performance block storage metadata unit associated with the revised page.

11. The computer program product as recited in claim 10, wherein the digital computing device is at least one of a server system and a storage subsystem.

12. A data structure for providing high performance block storage metadata containing a write activity level metric for data storage performance enhancement, wherein the data structure is stored on a non-transitory computer readable storage media, the data structure comprising:

a page defined by a sequence of fixed-size blocks, each of the fixed-size blocks comprising a data block and a footer, and wherein a confluence of the footers defines a high performance block storage metadata unit associated with the page, wherein each footer in the confluence of the footers includes a Tag field, wherein at least one of the footers in the confluence of the footers includes a Type field, wherein at least one of the footers in the confluence of the footers includes a Checksum field containing a checksum that covers all of the data blocks and all of the footers of the entirety of the sequence of fixed-size blocks, wherein each footer in the confluence of the footers includes space for application metadata, wherein the space for application metadata in the confluence of the footers includes one or more information units each spanning across at least two of the footers in the confluence of the footers from one of the footers to another of the footers and each of the information units comprising a subtype field, a length field, and a data field, wherein the subtype field distinguishes between different types of the information units, wherein the subtype field of one of the information units includes a "write activity level" value, and wherein the data field of one of the information units includes a "write-activity-index" value indicating a write frequency of the page and a write timestamp.

13. The data structure as recited in claim 12, wherein the "write-activity-index" value is a write "hotness" metric ranging from 0 to 127, respectively indicating in the former case that the page has a relatively lower write frequency and in the latter case that the page has a relatively higher write frequency.

14. The data structure as recited in claim 12, wherein the write timestamp is a 32bit value representing the number of seconds elapsed between Jan. 1, 2000 and the previous write of the page.

15. The data structure as recited in claim 12, wherein the data block for each of the fixed-size blocks is stored in a separate physical area of the computer readable signal bearing media than the footer associated therewith.

16. The data structure as recited in claim 12, wherein the data block for each of the fixed-size blocks is stored in the same physical area of the computer readable signal bearing media as the footer associated therewith.

* * * * *